(12) United States Patent
Rice et al.

(10) Patent No.: US 12,546,101 B2
(45) Date of Patent: Feb. 10, 2026

(54) SYSTEM AND METHODS FOR STORING AND DISPENSING A FLOWABLE MATERIAL

(71) Applicant: S. C. Johnson & Son, Inc., Racine, WI (US)

(72) Inventors: William J. Rice, Antioch, IL (US); Douglas A. Soller, Racine, WI (US); Steven A. Zach, Waterford, WI (US); James Paul Orrico, Evanston, IL (US); Mario M. Orrico, Chicago, IL (US); Harbinder S. Pordal, Mason, OH (US)

(73) Assignee: S. C. Johnson & Son, Inc., Racine, WI (US)

( * ) Notice: Subject to any disclaimer, the term of this patent is extended or adjusted under 35 U.S.C. 154(b) by 134 days.

(21) Appl. No.: 18/036,222

(22) PCT Filed: Nov. 11, 2021

(86) PCT No.: PCT/US2021/072348
§ 371 (c)(1),
(2) Date: May 10, 2023

(87) PCT Pub. No.: WO2022/104352
PCT Pub. Date: May 19, 2022

(65) Prior Publication Data
US 2023/0417038 A1    Dec. 28, 2023

Related U.S. Application Data

(60) Provisional application No. 63/113,065, filed on Nov. 12, 2020.

(51) Int. Cl.
*E03D 9/02* (2006.01)
*E03D 9/03* (2006.01)

(52) U.S. Cl.
CPC ............. *E03D 9/022* (2013.01); *E03D 9/032* (2013.01); *E03D 2009/026* (2013.01)

(58) Field of Classification Search
CPC .................................................... E03D 9/022
See application file for complete search history.

(56) References Cited

U.S. PATENT DOCUMENTS 3,466,131 A    9/1969    Arcudi
6,669,387 B2   12/2003   Gruenbacher et al.
(Continued)

FOREIGN PATENT DOCUMENTS

BR    202015021299 U2   3/2017
CN        107125424 A   9/2017
(Continued)

OTHER PUBLICATIONS

Feb. 11, 2022—(WO) International Search Report and Written Opinion—App PCT/US21/72348.
(Continued)

*Primary Examiner* — Christine J Skubinna
(74) *Attorney, Agent, or Firm* — Banner & Witcoff, Ltd.

(57) ABSTRACT

A system for applying a flowable material to a surface that includes an applicator and a storage pod is disclosed. The storage pod may have a housing and a lid that engage each other to form an interior cavity that contains a flowable material. The applicator receives the storage pod and has a pusher mechanism to apply a force to the housing causing the housing to collapse. As the housing collapses, the flowable material is expelled from the storage pod. The applicator may be a reusable applicator where the storage pods can be used and reloaded, or a single use disposable applicator.

20 Claims, 31 Drawing Sheets

(56) References Cited

U.S. PATENT DOCUMENTS

| | | |
|---|---|---|
| 7,056,877 B2 | 6/2006 | Caswell et al. |
| 7,520,406 B2 | 4/2009 | Jaichandra et al. |
| 7,709,433 B2 | 5/2010 | Veltman et al. |
| 7,874,420 B2 | 1/2011 | Coon |
| 8,157,464 B2 | 4/2012 | Prax |
| 8,443,970 B2 | 5/2013 | Coon |
| 8,754,025 B2 | 6/2014 | Wiedemann et al. |
| 8,794,293 B2 * | 8/2014 | Rice .................. B65D 75/527 |
| | | 156/578 |
| 9,212,476 B2 | 12/2015 | Muhlhausen et al. |
| 9,283,362 B2 | 3/2016 | Tereschouk |
| 9,347,210 B2 | 5/2016 | Delgigante et al. |
| 9,376,793 B2 | 6/2016 | DelGigante et al. |
| 9,410,111 B2 | 8/2016 | Wortley et al. |
| 9,492,839 B2 | 11/2016 | Delgigante et al. |
| 9,637,902 B2 * | 5/2017 | Burt .................. E03D 9/032 |
| 9,987,645 B2 | 6/2018 | Richman et al. |
| 10,479,964 B2 | 11/2019 | Klinkhammer et al. |
| 10,501,257 B2 | 12/2019 | Ruthe-Steinsiek |
| 10,555,592 B2 | 2/2020 | Dandiker et al. |
| 2007/0267444 A1 | 11/2007 | de Buzzaccarini et al. |
| 2007/0270325 A1 | 11/2007 | de Buzzaccarini et al. |
| 2011/0017406 A1 | 1/2011 | Schultz et al. |
| 2014/0059751 A1 | 3/2014 | Leppla et al. |
| 2014/0059752 A1 | 3/2014 | Leppla et al. |
| 2015/0175944 A1 | 6/2015 | Sikorska et al. |
| 2015/0259895 A1 | 9/2015 | DelGigante et al. |
| 2016/0333560 A1 | 11/2016 | Goulart et al. |
| 2016/0340623 A1 | 11/2016 | Sikorska et al. |
| 2016/0348348 A1 | 12/2016 | Sikorska et al. |
| 2018/0249806 A1 | 9/2018 | Tereschouk |

FOREIGN PATENT DOCUMENTS

| | | | |
|---|---|---|---|
| DE | 10222009 A1 | 12/2003 | |
| DE | 102010028352 A1 | 11/2011 | |
| EP | 1714605 A1 | 10/2006 | |
| EP | 2141221 A1 | 1/2010 | |
| EP | 2363354 A1 | 9/2011 | |
| EP | 3056615 A1 | 8/2016 | |
| GB | 191207068 A | 5/1913 | |
| GB | 229643 A | 4/1926 | |
| JP | 2018203976 A | 12/2018 | |
| WO | 10002256 A2 | 1/2010 | |
| WO | 10028941 A1 | 3/2010 | |
| WO | WO-2011040584 A1 * | 4/2011 | ............. B65D 77/20 |
| WO | 13054124 A1 | 4/2013 | |
| WO | 16037252 A1 | 3/2016 | |
| WO | 16102736 A2 | 6/2016 | |

OTHER PUBLICATIONS

Jul. 30, 2025—(EP) Examination Report EP App. No. 21820427.9.
Sep. 14, 2025—(CN) Office Action—App. No. 202180089856.9.

\* cited by examiner

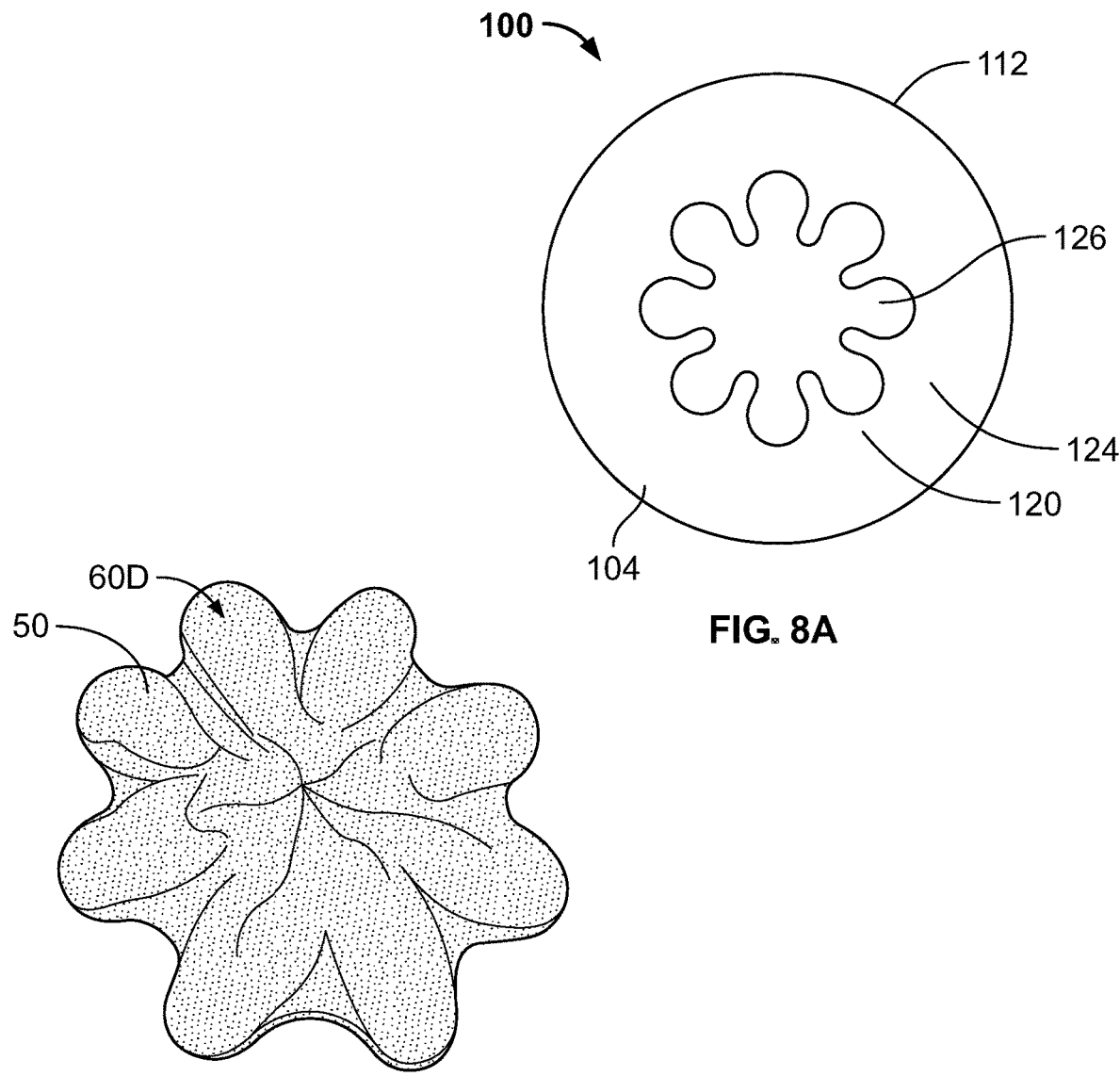
FIG. 8A
FIG. 8B
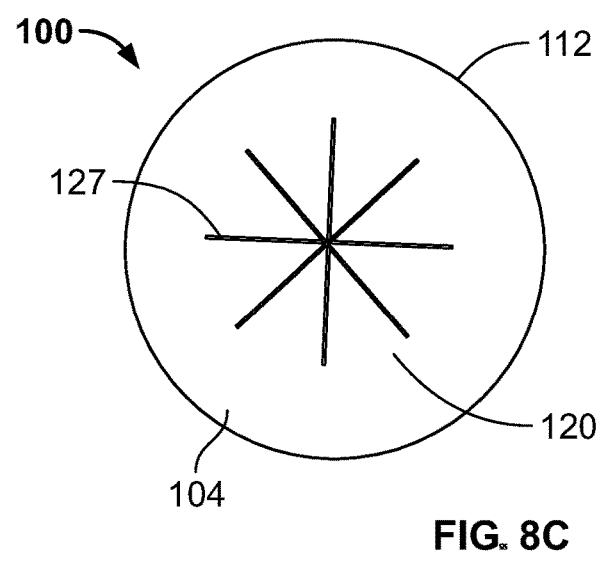
FIG. 8C

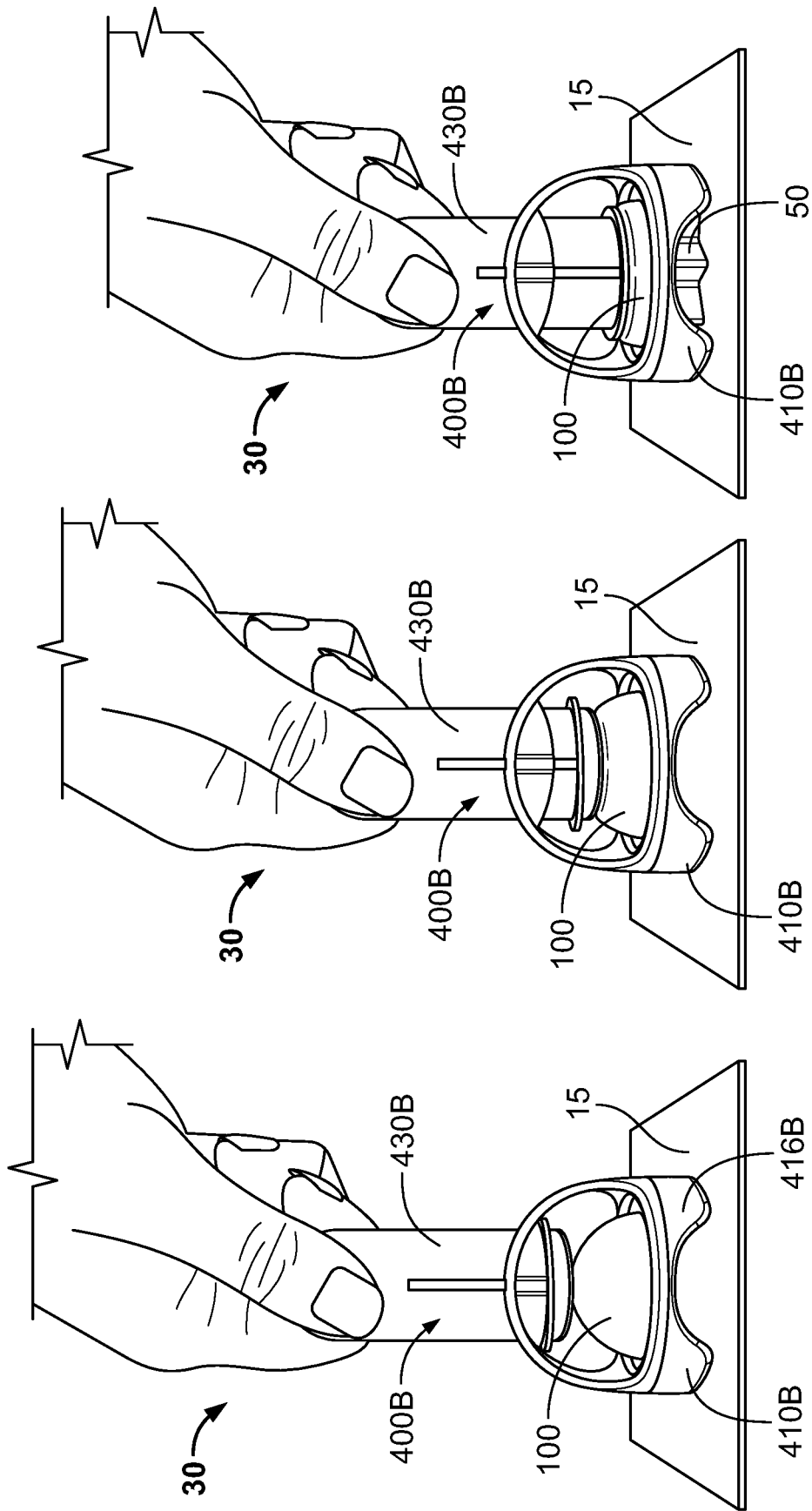

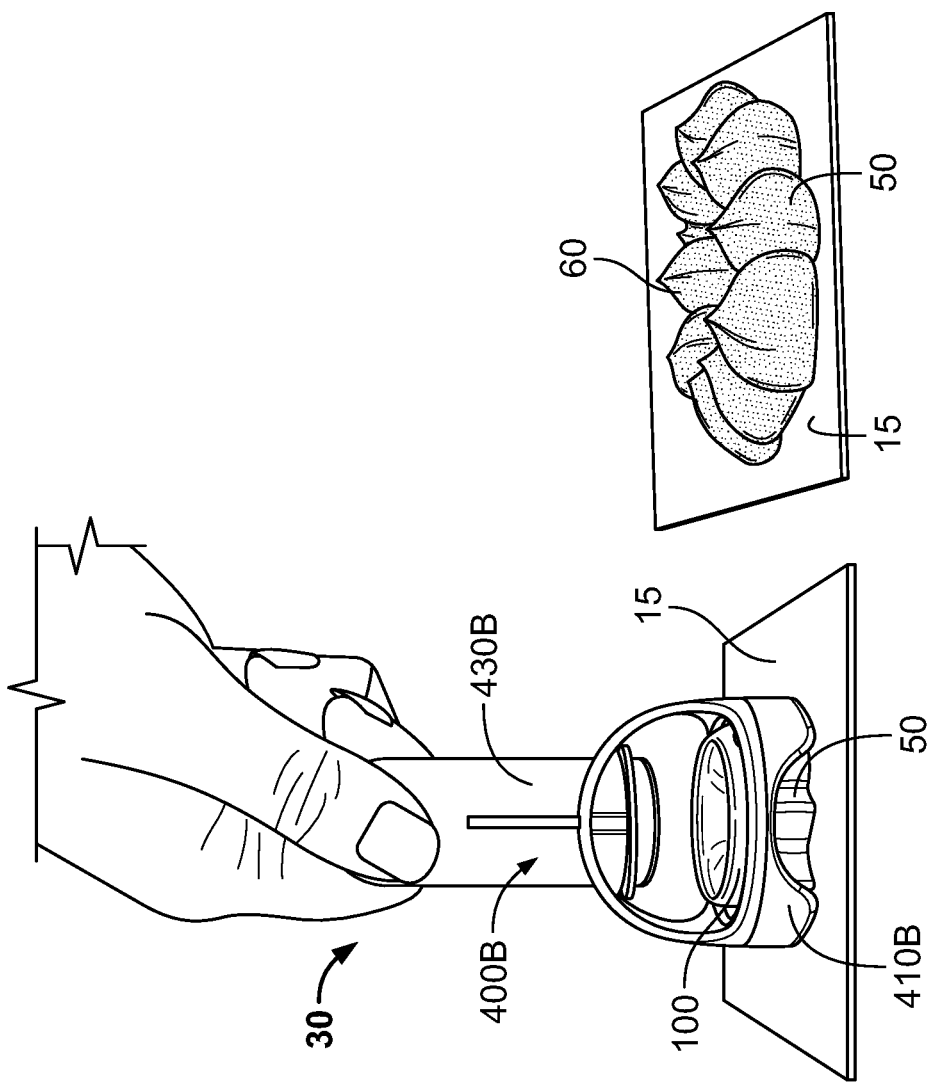
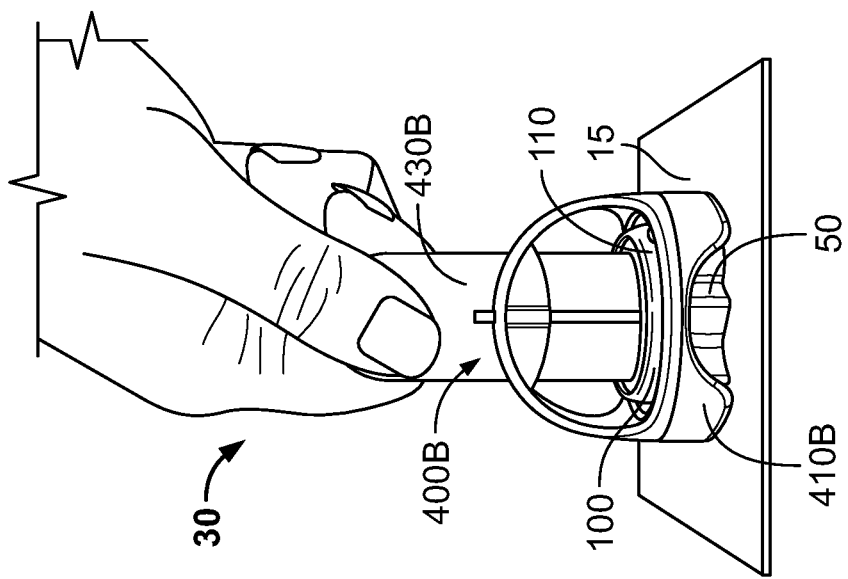

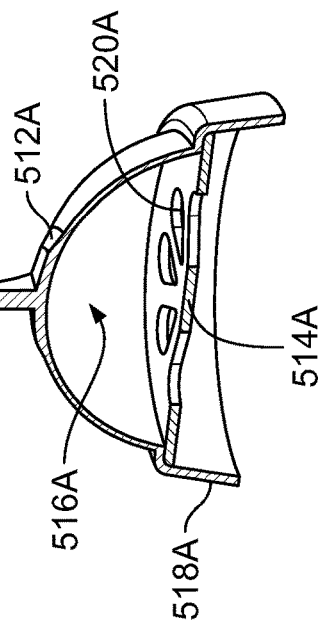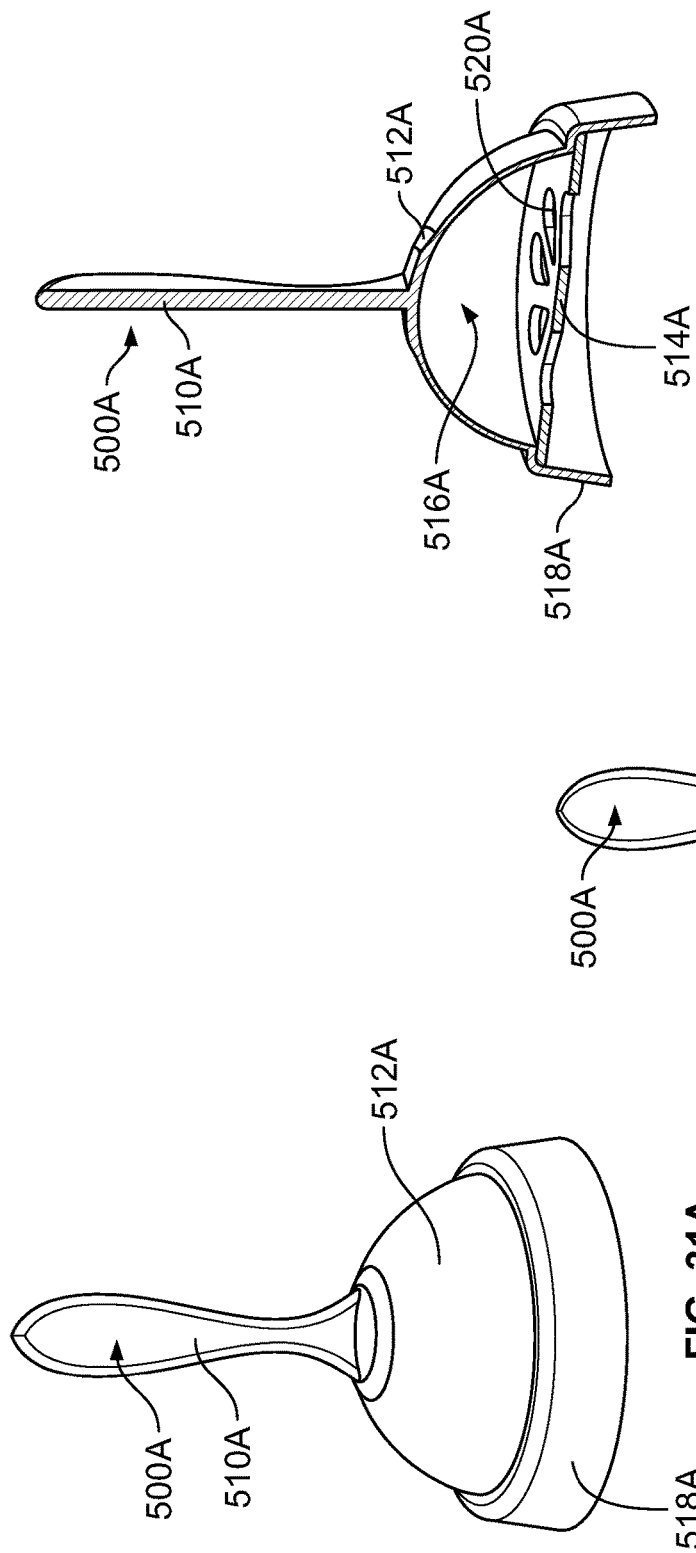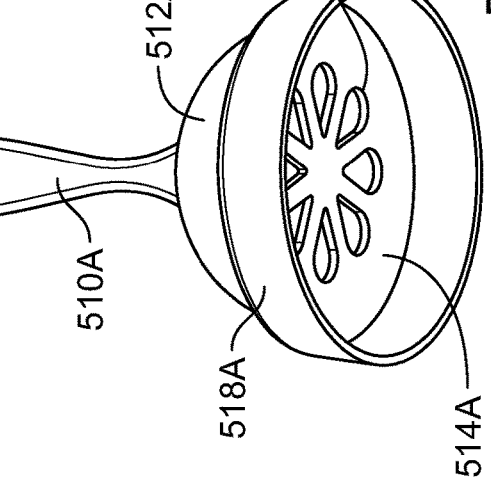

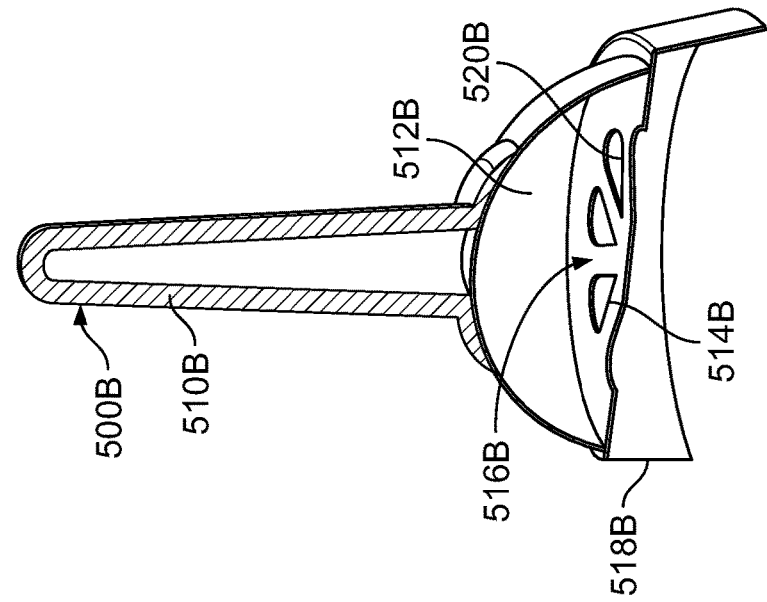
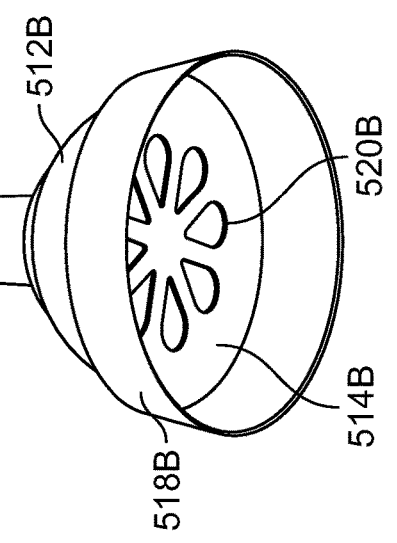
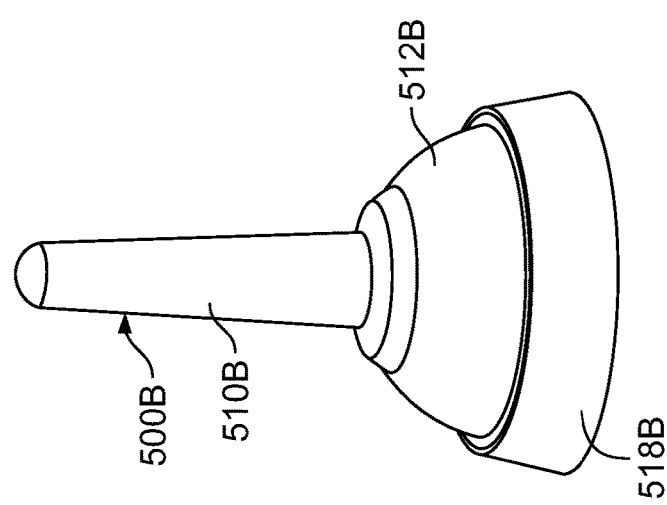

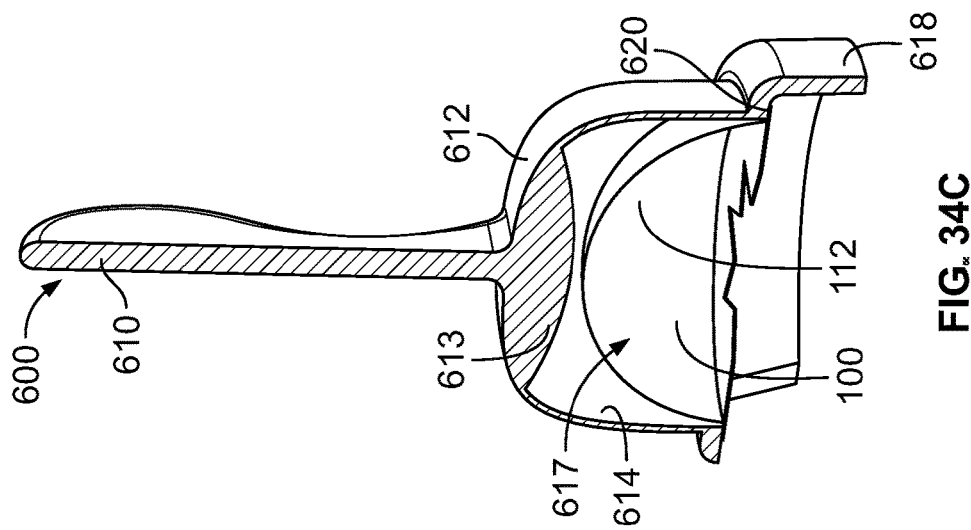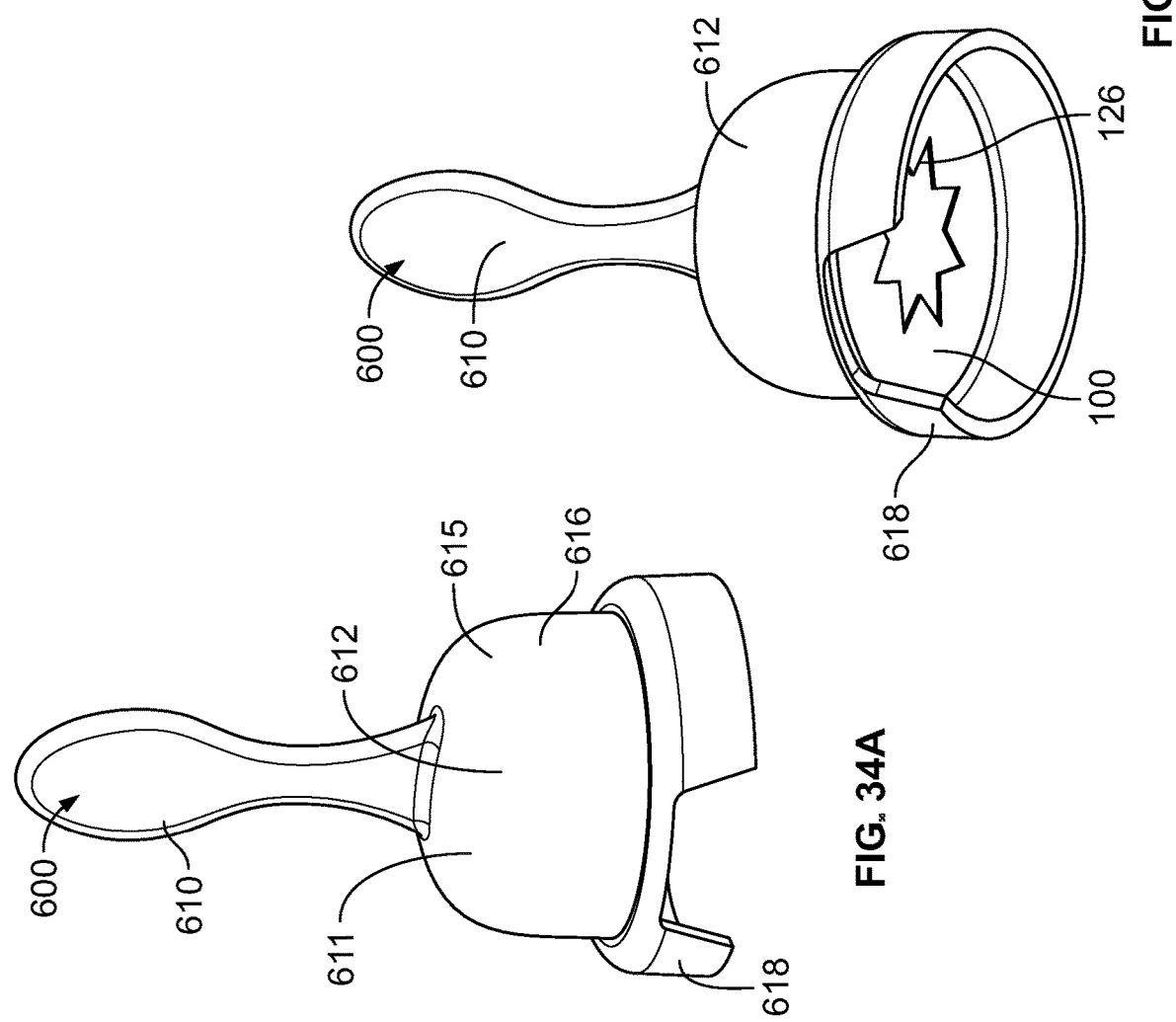

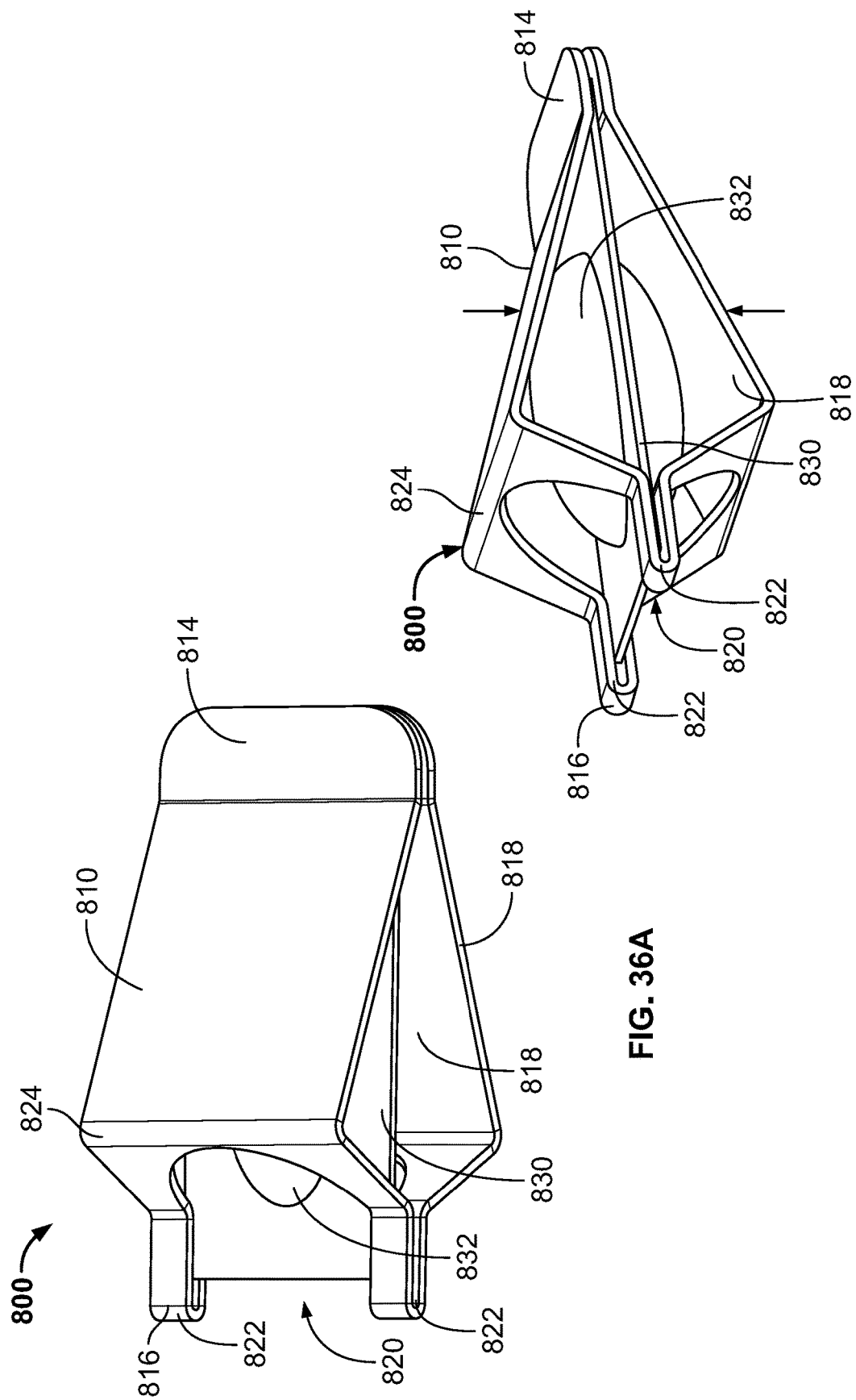

SYSTEM AND METHODS FOR STORING AND DISPENSING A FLOWABLE MATERIAL

CROSS-REFERENCE TO RELATED APPLICATIONS

This application is a U.S. National Stage application under 35 U.S.C. § 371 of International Application PCT/US2021/072348 (published as WO/2022/104352 A1), filed Nov. 11, 2021, which claims the benefit of priority to U.S. provisional patent application No. 63/113,065, filed Nov. 12, 2020. Benefit of the filing date of these prior applications is hereby claimed. Each of these prior applications is hereby incorporated by reference in its entirety.

FIELD

Aspects of this disclosure relate to a system and method for storing and dispensing flowable materials and more particularly, to a storage pod for storing a flowable material and an applicator dispensing a flowable material from the storage pod.

BACKGROUND

Applicators for depositing flowable materials can be used in toilet bowls to provide cleaning and/or disinfectant and/or fragrancing in the toilet bowl. A dollop of the flowable material, which may be a gel or adhesive gel, can be applied from a suitable applicator directly onto an inner surface of the toilet bowl, to which the substance adheres. The substance may remain on the inner surface of the toilet bowl even after being contacted with flush water, and typically the substance is only flushed away completely after a large number of flushes. The substance is also suitable for application to other surfaces such as urinals, lavatory or industrial sinks, showers, bathtubs, dishwashing machines and the like.

Particular objects and advantages will be apparent to those skilled in the art, that is, those who are knowledgeable or experienced in this field of technology, in view of the following disclosure and detailed description of certain embodiments.

SUMMARY

The disclosure relates to a system or device for accurately applying a flowable material to a surface. In one use, the system may include an applicator and a disposable container that is secured in the applicator. The system may be used for applying a fixed amount of a cleaning, disinfecting and/or fragrancing adhesive gel to the surface of a toilet, urinal, bathtub, shower, or any other hard surface. However, it is contemplated that the gel could be applied to any surface desired to be cleaned.

One aspect of this disclosure may relate to a storage pod for a flowable material that includes: a housing having an upper portion and a flange extending around a perimeter of the housing; a lid attached to the housing defining an interior volume, where the lid includes an inner layer that includes an aperture and a removable outer layer that when present covers a portion of the inner layer; and the flowable material disposed within the interior volume. The flowable material may be a cleaning gel. The amount of cleaning gel within the interior volume may be between 5 grams and 10 grams. The lid may be attached to the flange. The upper portion of the housing may be dome-shaped. A height of the storage pod measured from the lid, and a top of the housing may be less than a radius of the dome-shaped upper portion. The upper portion may be dome-shaped, and the flange may form a planar surface. In addition, an angle formed at an intersection of the flange and the upper portion may be greater than 90 degrees. When the outer layer of the lid is removed, the aperture of the inner layer and the flowable material may be exposed. The aperture may be formed from a single opening. The housing of the pod may be formed from an aluminum alloy.

Other aspects of this disclosure may relate to a system for dispensing a flowable material onto a surface that includes: (a) a storage pod for the flowable material and (b) an applicator. The storage pod may include: a housing that includes an upper portion with a flange extending around a perimeter of the housing; a lid attached to the housing defining an interior volume, where the lid includes an inner layer that includes an aperture and a removable outer layer that when present covers a portion of the inner layer; and the flowable material disposed within the interior volume. The applicator may include: (a) a base that has a base plate; a receiver on the base plate that secures the storage pod; and a support member extending from the base plate configured to contact the surface that receives the flowable material, where the support member positions the base plate a fixed distance from the surface; and a pusher mechanism configured to contact the upper portion of the housing. The pod may act such that the upper portion of the housing is configured to collapse when it receives a force applied from a user through the pusher mechanism. When the upper portion collapses, the flowable material is extruded through the aperture of the pod. The upper portion of the housing of the pod may be dome-shaped. The receiver of the applicator may be a cylindrical wall extending from the base, where the pusher mechanism is slidably engaged with the cylindrical wall. The pusher mechanism may have a first end that is configured to contact the storage pod, a second end opposite the first end, and a pusher body extending between the first end and the second end. The first end of the pusher mechanism may include a dome-shaped end that substantially aligned with a longitudinal axis of the storage pod. The dome-shaped end may have a width that is less than a width of the pusher body. A stepped portion may extend between the dome-shaped end and the pusher body, where the stepped portion includes a vertical step that extends in a direction substantially parallel with the longitudinal axis of the pusher body. The applicator may further include a biasing member to provide a return force upon the pusher mechanism after application of the flowable material. The support member may be a plurality of legs extending from the base plate. In addition, the support member may be a member that extends around a perimeter of the base. In one example, the guide member and the base are formed as a single, integral member. In some examples, the applicator may include a pair of arms that are foldably engaged with the base plate, and where each arm of the pair of arms folds toward each other and each arm has an interior surface that together form the pusher mechanism. The base plate and the pair of arms may be formed as a single unitary member. Each pair of arms of the pair of arms further includes a handle portion arranged substantially perpendicular to the base plate.

Still other aspects of this disclosure may relate to a method for dispensing a flowable material onto a surface that includes: (1) providing a storage pod, where the storage pod includes a housing with a dome-shaped portion with a flange extending around a circumference of the dome-shaped portion and a lid attached to the housing defining an interior volume, where the lid may include an inner layer that has an aperture and a removable outer layer that when present covers a portion of the inner layer; (2) removing the outer layer of the storage pod; (c) placing the storage pod onto a receiver of an applicator, where the flange is received within the receiver and the dome-shaped portion of the housing extends upward from the receiver; (d) placing a support member of the applicator against the surface receiving the flowable material; and (e) applying a force to a pusher mechanism of the dispenser, where the force presses the pusher mechanism onto the dome-shaped portion causes the dome-shaped portion to collapse wherein as the dome-shaped portion collapses, the flowable material is extruded through the aperture.

Additional aspects of this disclosure may relate to a system, which can be single use or multiple use, for dispensing a flowable material onto a surface that includes a storage pod for the flowable material comprising: (a) a housing that includes an upper portion and a flange extending around a perimeter of the housing; (b) a lid attached to the housing defining an interior volume, where the lid includes an inner layer that includes an aperture; and (c) a flowable material disposed within the interior volume; and an applicator comprising: (a) a base with a base plate and a receiver on the base plate that secures the storage pod; and a support member extending from the base plate configured to contact the surface that receives the flowable material, wherein the support member positions the base plate a fixed distance from the surface; and (b) a pusher configured to contact the upper portion of the housing, where the upper portion of the housing is configured to collapse when receiving a force applied from a user through the pusher, and when the upper portion collapses, the flowable material is extruded through the aperture. The applicator may also include a guide member that includes a guide opening that receives the pusher, where the pusher extends through the guide opening. In one example, the guide member and the base are formed as a single, integral member. The guide member may engage the base along a perimeter of the base. The pusher may include a pusher body with a plate-like shape having a substantially rectangular cross-sectional shape. In some examples, the pusher may include a rib along a front surface of the pusher body, and may also include a dome-shaped end with a stepped region.

Another example can include a system for dispensing a flowable material onto a surface. The system may include a storage pod for the flowable material having a housing that includes an upper portion and a flange extending around a perimeter of the housing. A lid may be attached to the housing defining an interior volume. The lid can include an inner layer that includes an aperture and a removable outer layer that when present covers a portion of the inner layer. The flowable material can be disposed within the interior volume. An applicator can include a base including a receiver, and the receiver can be for holding the storage pod. The receiver can define a first side defining a first opening and a second side can define a second opening. The applicator can be configured to receive the storage pod in either the first side or the second side. A pusher mechanism can be configured to contact the upper portion of the housing. The upper portion of the housing can be configured to collapse when receiving a force applied from a user through the pusher mechanism, and when the upper portion collapses, the flowable material can be extruded through the aperture. The upper portion can be dome-shaped. The receiver may include a wall extending from the base, and the pusher mechanism can be slidably engaged with the wall. The pusher mechanism may have a first end that contacts the storage pod and a second end opposite the first end. The wall can include a guide opening for receiving the pusher mechanism. The base and the wall can be formed as a single unitary member. The pusher mechanism may include a rib and the rib can be configured to be received in a correspondingly shaped guide located on the base. The first end of the pusher mechanism can include a dome-shaped end that is substantially aligned with a longitudinal axis of the storage pod. The dome-shaped end can have a width that is less than a width of the pusher body. The support member can include a plurality of legs extending from the base. The base can include a plate configured to support the storage pod and the plate can be flush with a lower portion of the first opening. In addition, or alternatively the plate can be flush with a lower portion of the second opening. The second side may define a lip, and the lip can be configured to retain the pod within the receiver when a force is applied from a user through the pusher mechanism. The first side of the receiver may also include a lip configured to retain the pod within the receiver when a force is applied from a user through the pusher mechanism.

These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which:

FIG. 8A illustrates a bottom view of an alternate exemplary storage pod with a layer of the lid removed according to aspects described herein;

FIG. 8B illustrates a perspective view of the flowable material when dispensed from the storage pod of FIG. 8A according to aspects described herein;

FIG. 8C illustrates a illustrates a bottom view of an alternate exemplary storage pod with according to aspects described herein;

FIGS. 30A-30F illustrate a process of expelling the flowable material from an exemplary storage pod from the exemplary applicator system of FIG. 22A according to aspects described herein;

FIGS. 31A and 31B illustrate perspective views of another exemplary applicator for expelling a flowable material according to aspects described herein;

FIG. 31C illustrates a cross-sectional perspective view of the exemplary applicator of FIGS. 31A and 31B according to aspects described herein;

FIGS. 32A and 32B illustrate perspective views of another exemplary applicator for expelling a flowable material according to aspects described herein;

FIG. 32C illustrates a cross-sectional perspective view of the exemplary applicator of FIGS. 32A and 32B according to aspects described herein;

FIGS. 34A and 34B illustrate perspective views of another exemplary applicator for expelling a flowable material according to aspects described herein;

FIG. 34C illustrates a cross-sectional perspective view of the exemplary applicator of FIGS. 34A and 34B according to aspects described herein;

FIGS. 36A and 36B illustrate perspective views of another exemplary applicator for expelling a flowable material according to aspects described herein;

Figure 1A:
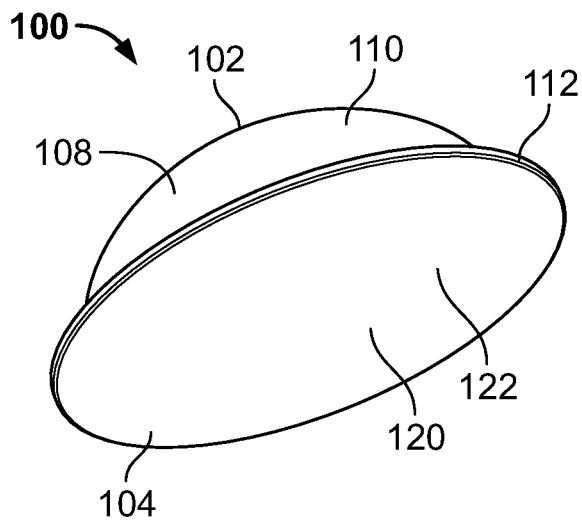
FIG. 1A illustrates a perspective view of an exemplary storage pod for dispensing a flowable material according to aspects described herein.

The figures referred to above are not drawn necessarily to scale, should be understood to provide a representation of particular embodiments, and are merely conceptual in nature and illustrative of the principles involved. Some features of the applicator depicted in the drawings have been enlarged or distorted relative to others to facilitate explanation and understanding. The same reference numbers are used in the drawings for similar or identical components and features shown in various alternative embodiments. Applicators and storage pods for flowable materials as disclosed herein would have configurations and components determined, in part, by the intended application and environment in which they are used.

DETAILED DESCRIPTION OF EMBODIMENTS

In general, this disclosure relates to a storage pod for containing and dispensing a flowable material where the flowable material is dispensed from the storage pod using an applicator that applies a force to the housing of the pod at one side of the pod that causes the pod to collapse. As the pod collapses, the flowable material is extruded from an opposite side of the pod onto a designated surface. As the flowable material contacts the designated surface, the flowable material may spread out radially in a uniform pattern to create a dollop of the material on the surface.

The term "substantially" as used herein is meant to mean mostly, or almost completely, within the constraints of sensible commercial engineering objectives, costs, manufacturing tolerances, and capabilities in the field of applicators and storage pods for flowable materials. Similarly, the term "approximately" as used herein is meant to mean close to, or about a particular value, within the constraints of sensible commercial engineering objectives, costs, manufacturing tolerances, and capabilities in the field of applicators and storage pods for flowable materials.

Figure 1B:
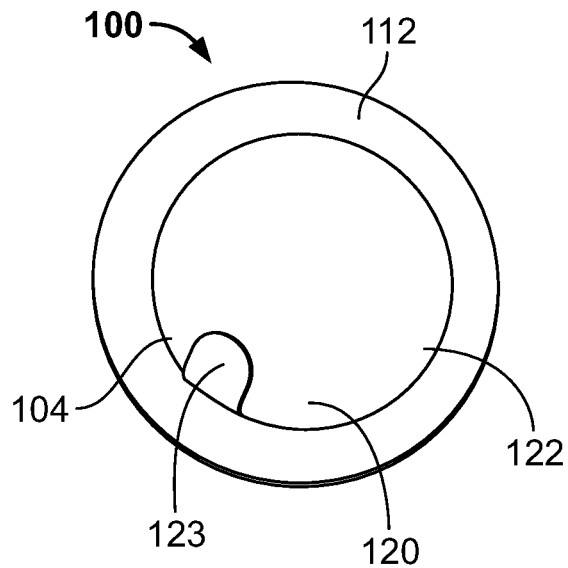
FIG. 1B illustrates a bottom perspective view of an alternate exemplary storage pod for dispensing a flowable material according to aspects described herein.
Figure 2:
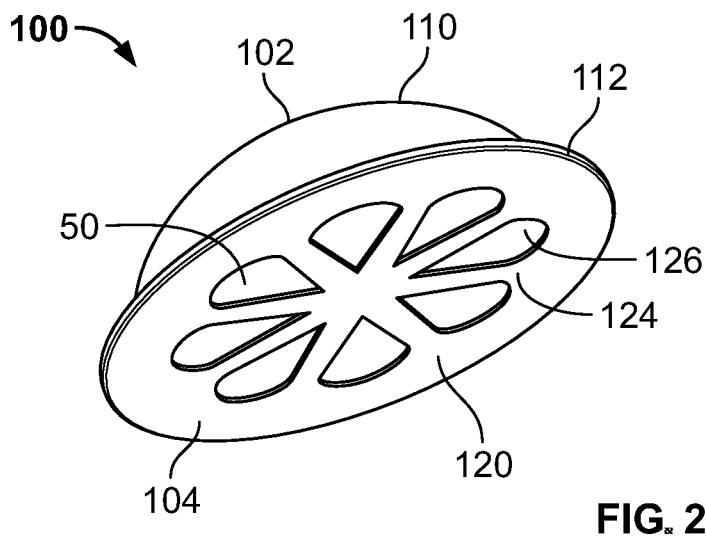
FIG. 2 illustrates a perspective view of the storage pod of FIG. 1A with a layer of the lid removed according to aspects described herein.

FIGS. 1A-2 illustrate an exemplary storage pod 100 for a flowable material 50 that has an upper end 102, a lower end 104 opposite the upper end 102, where the flowable material 50 may be expelled out the lower end 104 of the storage pod 100. The pod 100 may include a housing 108 that has an upper portion 110 that extends from the upper end 102 of the pod 100 to proximate the lower end 104. A flange 112 may extend from and around a perimeter of the lower end of the upper portion 110 proximate the lower end 104 of the pod 100. A lid 120 may be attached to the housing 108 to define an interior cavity that holds the flowable material 50. The lid 120 may be secured to the flange 112 of the pod 100. The lid 120 may include an outer layer 122 and an inner layer 124, where the inner layer has an aperture or a plurality of apertures 126 that allow the flowable material 50 to exit the pod 100 when an expelling force is applied to the housing 108. As shown in the example of FIGS. 1A-2, the upper portion 110 of the housing 108 may be dome or hemispherical-shaped, with the flange 112 positioned around the upper portion 110. The flange 112 may have a circular shape and extend from and around a circumference of the upper portion 110. In other examples, the upper portion 110 of the housing 108 may have any shape that can form an interior cavity with the lid 120, such as a conical shape, a cylindrical shape, a cuboid shape, a frusto-conical shape, or other shape as known to one skilled in the art.

The lid 120 may provide a seal for the pod 100 and provide a watertight storage container for the flowable material 50 until the flowable material 50 is ready to be dispensed. The outer layer 122 of the lid 120 may be removable, such that when the outer layer 122 is removed exposes the aperture 126 and the flowable material 50. By removing the removable layer 122, the flowable material 50 is ready to be dispensed. The removable layer 122 may cover at least a portion of the inner layer 124 to help retain the flowable material 50 within the pod 100. As shown in FIG. 1B, the removable layer 122 may have a tab or gripping member 123 to allow a user to easily grasp and remove the outer layer 122. The outer layer 122 may be attached to the inner layer 124 and/or flange 112 with an adhesive and may be formed from a polymeric material, such as a vinyl material. When the outer layer 122 of the lid 120 is removed, the aperture 126 and the flowable material 50 may be exposed as shown in FIG. 2. As shown in FIG. 1A, the outer layer 122 may cover the entire inner layer 124, or optionally, may only cover an area of the inner layer 124 that is large enough to cover the aperture or apertures 126.

Figure 3:
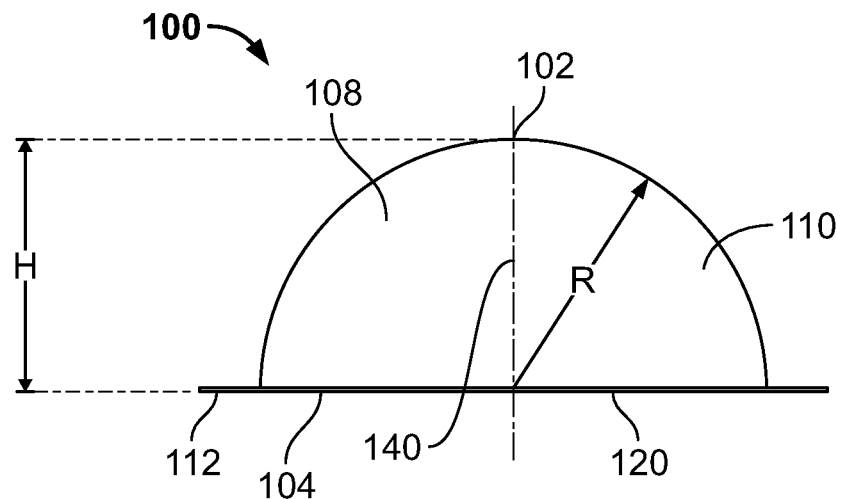
FIG. 3 illustrates a side view of the exemplary storage pod of FIG. 1A according to aspects described herein.
Figure 4:
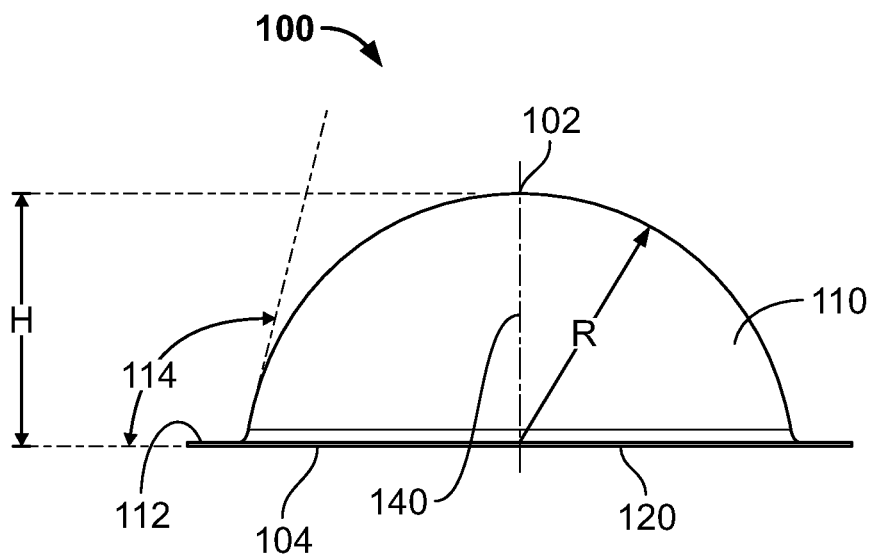
FIG. 4 illustrates a side view of an alternate exemplary storage pod according to aspects described herein.
Figure 5:
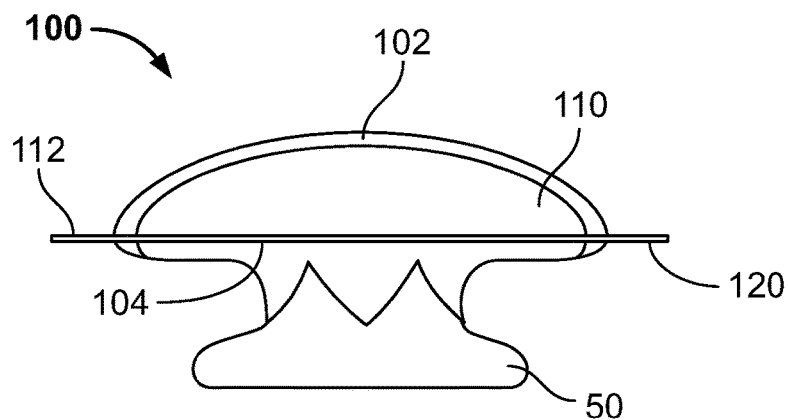
FIG. 5 illustrates a flowable material being dispensed from an exemplary storage pod according to aspects described herein.

As shown in FIGS. 3 and 4, the upper portion 110 of housing 108 may be dome-shaped or hemispherical-shaped. The pod 100 may have a height, H, measured as a perpendicular distance from a lower end 104 of the pod 100 to an upper end 102 of the pod 100 at a top of the upper portion 110 of housing 108. In some examples, the flange 112 may form a planar surface that intersects with the upper portion 110. In the illustrated examples, the radius, R, of the dome-shaped upper portion may be greater than or equal to the height, H, of the pod 100. In addition, the height, H, may be within a range of 0.55 inches and 0.65 inches and an overall width of the pod 100 measured as the width of the flange may be within a range of 1.40 inches and 1.70 inches. As shown in FIG. 4, by having the height, H, of the upper portion less than the radius, R, an angle 114 that is greater than 90 degrees (i.e. an obtuse angle) may be formed between the flange 112 and the upper portion 110 at an intersection of the flange 112 and the upper portion 110 to help minimize the crushing force needed to collapse upper portion 110 of the housing 108 and expel the flowable material 50 from the pod 100 as shown in FIG. 5. The force needed to collapse the upper portion 110 of the pod 100 and expel the flowable material 50 may be approximately 10 pounds, or within a range of 8 pounds and 12 pounds, or within a range of 6 pounds and 14 pounds. This relationship of having the radius, R, being greater than the height, H, of the pod 100 may also help to maximize the expulsion of the flowable material 50. For examples, angle 114 may be within a range of 91 degree and 189 degrees. Other means are contemplated as well to help minimize the crushing force, such as the upper portion 110 having a localized thinner wall thickness near the flange 112 compared to other areas of the housing 108, and/or the housing 108 having a recess or other feature to cause a stress concentration to create a repeatable crush zone. The pod 100 may also have a longitudinal axis 140 that extends through a center of the lid 120 of the pod 100 and extends substantially perpendicular to the flange 112.

The components of the pod 100 may be formed of various means. For example, the housing 108 including the upper portion 110, the flange 112, and the lid 120 may be formed from a metallic material, such as an aluminum alloy. By forming the components from metallic material in some cases, forming the housing 108 and the lid 120 from the same material, the pod 100 may be easily recycled after the flowable material 50 is dispensed. In some examples, the housing 108 may have an upper portion 110 formed from an aluminum sheet with a thickness of approximately 0.003 inches, or within a range of 0.002 inches and 0.005 inches, and formed to the appropriate housing shape. The housing 108 may be formed as a single unitary member from the aluminum sheet. The flange 112 may help to add stiffness and provide a location to hold the pod 100 during the filling and assembly process. The lid 120 may be attached and sealed to the flange 112 using a heating or pressing operation such that the lid 120 may have a rolled edge where it attaches to the flange 112. Alternatively, the components of pod 100 may be formed from a polymer material, such as polypropylene, high-density polyethylene, low-density polyethylene, or may be a mixture of metallic and polymeric materials.

Figure 6A:
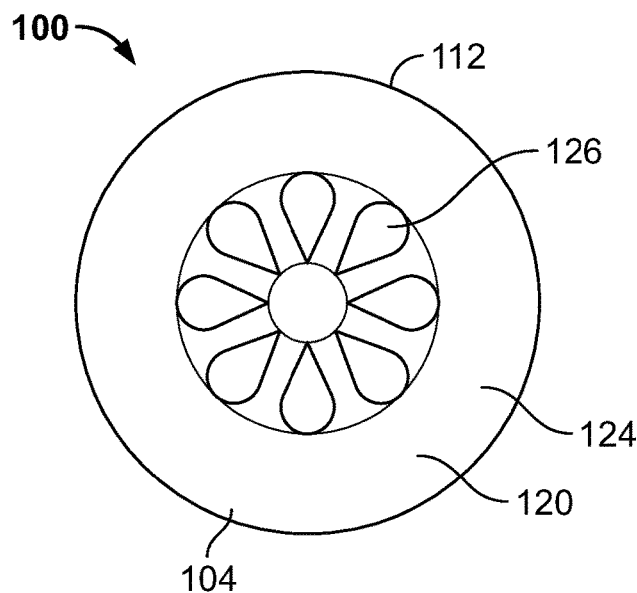
FIG. 6A illustrates a bottom view of an exemplary storage pod with a layer of the lid removed according to aspects described herein.
Figure 6B:
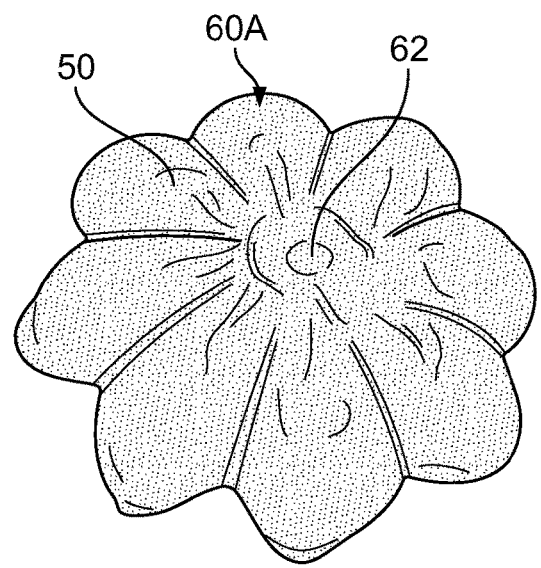
FIG. 6B illustrates a perspective view of the flowable material when dispensed from the storage pod of FIG. 6A according to aspects described herein.
Figure 6C:
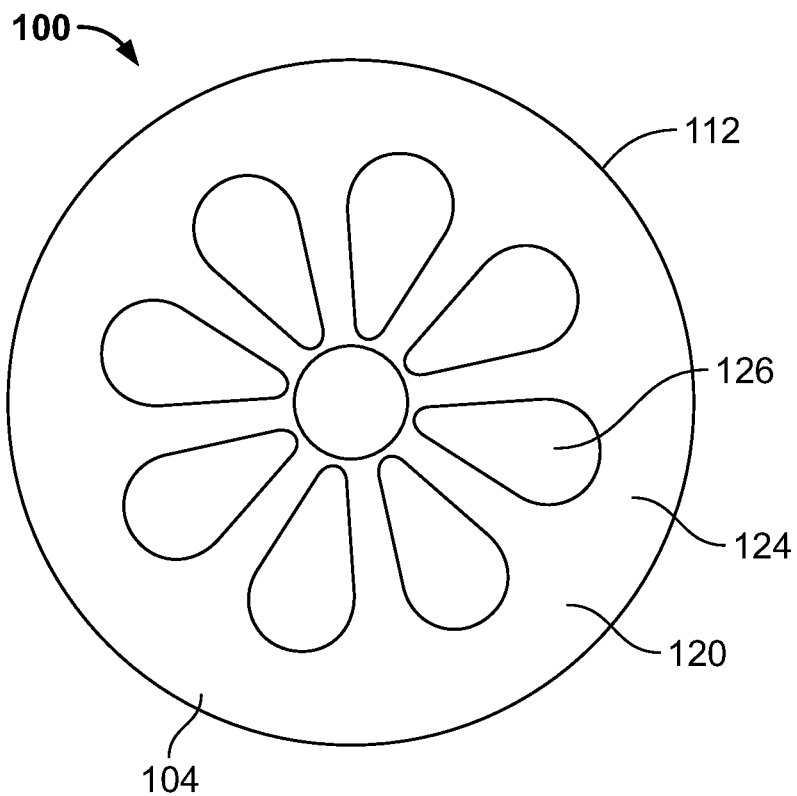
FIG. 6C illustrates a bottom view of an alternate exemplary storage pod with a layer of the lid removed according to aspects described herein.
Figure 6D:
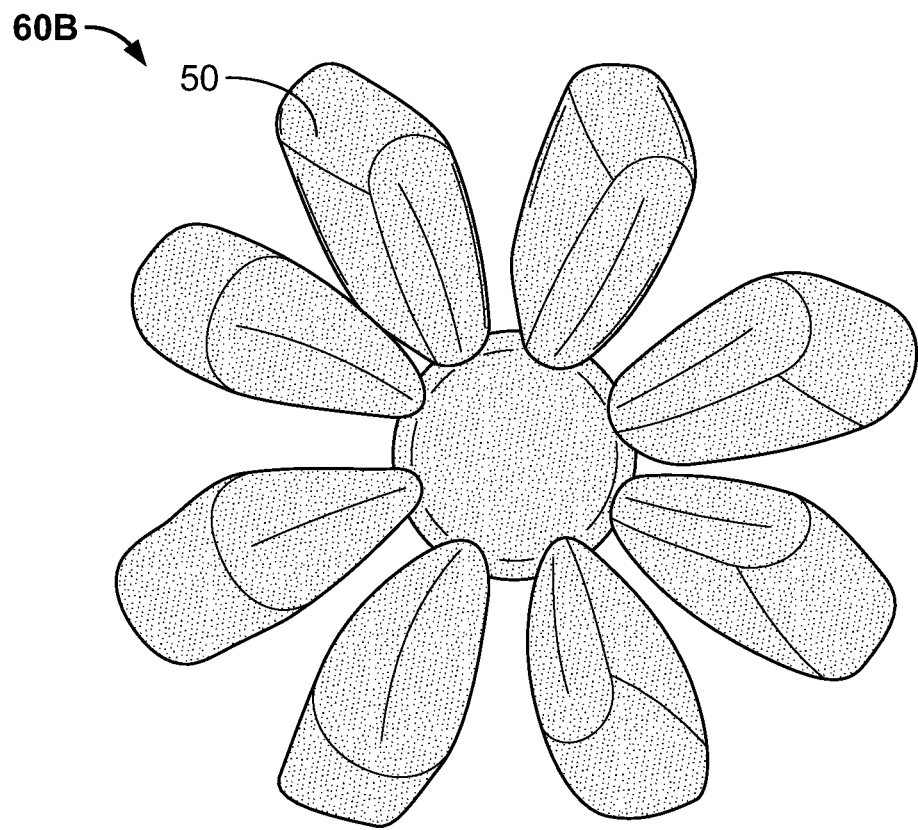
FIG. 6D illustrates a perspective view of the flowable material when dispensed from the storage pod of FIG. 6C according to aspects described herein.
Figure 7A:
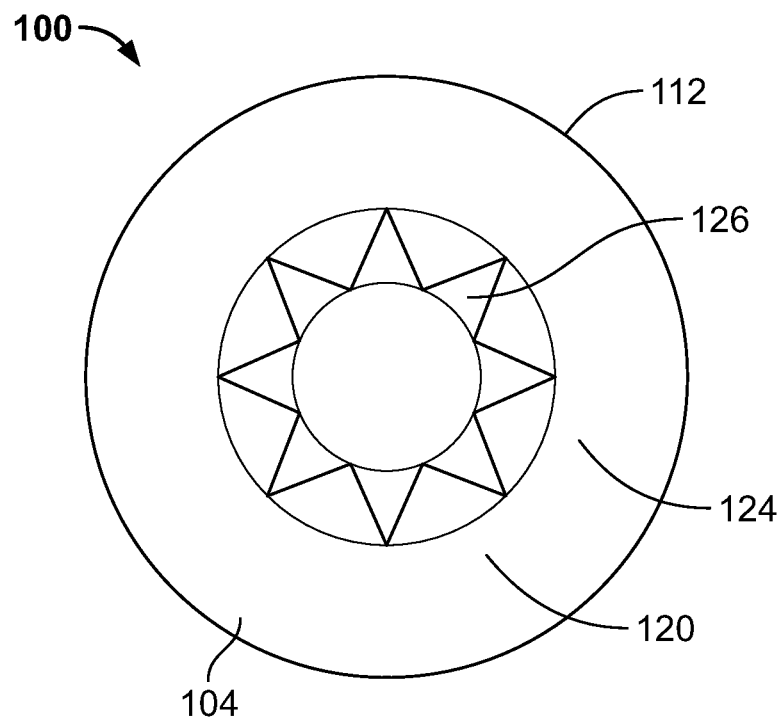
FIG. 7A illustrates a bottom view of an alternate exemplary storage pod with a layer of the lid removed according to aspects described herein.
Figure 7B:
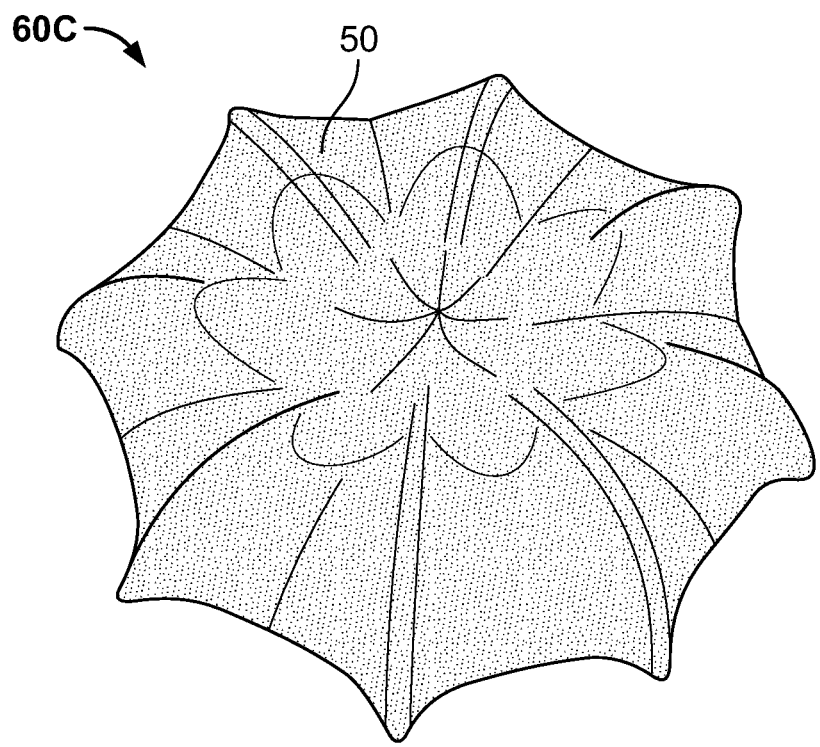
FIG. 7B illustrates a perspective view of the flowable material when dispensed from the storage pod of FIG. 7A according to aspects described herein.

As discussed above, the aperture 126 may have a shape that forms a gel dollop 60 that mimics the shape of the aperture 126 as the flowable material 50 exits the pod 100. In some examples, the aperture 126 may be a single opening as shown in FIGS. 7A and 8A or in other examples, the aperture or apertures 126 may be a plurality of openings as shown in FIGS. 6A and 6C. The shape of the aperture 126 may form the dollop 60 into the desired shape, e.g. rectangular, circular, oval, and even and odd sided polynomials, etc. For example, the apertures 126 shown in FIGS. 6A and 6C have a plurality of openings, where the arrangement of the plurality of teardrop shaped openings that are arranged in a circular shape around a center region on the inner layer 124. The center region of the arrangement shown in FIG. 6A may not have an opening to create a void 62 in a center region of the dollop 60A as shown in FIG. 6B. The void 62 in the dollop 60A may hold water to prevent the flowable material 50 from drying out. Alternatively, the center region of the arrangement shown in FIG. 6C may have an opening to create a center dollop region of the dollop 60B as shown in FIG. 6D. As another example, the aperture 126 shown in FIG. 7A illustrates a generally star shaped aperture that forms a star shaped dollop 60C of flowable material 50 shown in FIG. 7B. As still another example, the aperture 126 shown in FIG. 8A illustrates a generally flower shaped aperture with a central opening and a plurality of rounded openings extending from the central opening that forms a flower shaped dollop 60D of flowable material 50 shown in FIG. 8B. In addition to controlling the shape of the dollop, the shape of the aperture 126 may help to enhance the overall amount of gel that is evacuated from the pod 100. In some examples, when collapsed by the pusher as described below, the pod 100, when collapsed, may have at least 80 percent gel evacuation from the pod 100 or at least 90 percent gel evacuation from the pod 100. The dollop 60 may have a size with a diameter within a range of 1.3 inches to 1.8 inches.

Alternatively, the pod 100 may have a lid 120 with a single layer, such that once the lid 120 is removed, the flowable material 50 is exposed and expelled when then the upper portion 110 is crushed. In this configuration, the flowable material 50 may not be expelled into a predetermined shape. As yet another option, the pod 100 may have a lid 120 with a single layer where the lid 120 has a predetermined perforated shape 127, or predetermined area of reduced thickness compared to other regions on the lid 120 such that when a crushing force is applied to the upper portion 110, the increased pressure may cause the predetermined perforated shape (or area of reduced thickness) to tear or open in a controlled manner to expel the flowable material 50 as a dollop with a predetermined shape. The predetermined perforated shape 127 may be created using laser scoring or other method.

The flowable material 50 may be a gel or adhesive gel. The flowable material 50 may be a cleaning gel. The gels may provide cleaning and/or disinfectant and/or fragrancing for a toilet bowl when dispensed therein. An exemplary adhesive gel is disclosed in U.S. Pat. No. 6,667,286, the entire disclosure of which is incorporated herein by reference. The gels may have different colors, different amounts of cleaning, disinfectant, and/or fragrancing materials. For example, the pod 100 may include a divider, or a plurality of dividers, within the upper portion 110 to form distinct chambers within the pod 100 such that each chamber may contain a different gel as discussed above. The dividers may also include weaker points, such as thinner sections, different materials, notches, cutouts, etc. in order for the dividers to also be crushed during the application of the gel. The pod 100 may contain a single dosage or application of the cleaning gel within the interior cavity of the pod 100. For example, in some examples, the pod 100 may contain approximately 6.5 grams of flowable material, or may be within a range between 5 grams and 10 grams of flowable material 50.

FIGS. 9A-13 illustrate a system 10 that uses an exemplary applicator 200 to expel the flowable material 50 onto a surface or substrate from storage pod 100. Applicator 200 may be reused multiple times to apply one pod 100 at a time and may include a base 210 that is configured to receive the storage pod 100 and a pusher mechanism 230 that is slidably engaged with the base 210 and configured to transmit a crushing force onto the storage pod 100. The base 210 may have a first end 212 that may contact the surface that receives the flowable material 50 and a second end 214 opposite the first end 212. The base 210 may include a base plate 216 near the first end 212, a receiver 218 positioned near the first end 202 and a receiver 218 configured to secure the storage pod 100 to the base plate 216, and a support member 220 extending from the base plate 216 to the first end 202. The base plate 216 may include an opening to allow the flowable material 50 expelled from the pod 100 to flow onto the desired surface. The support member 220 may be configured to contact the surface 15 that receives the flowable material 50.

The pusher mechanism 230 may be removable from the base 210 to allow the storage pod 100 to be loaded into the base 210. The pusher mechanism 230 may be a piston and have a first end 232, a second end 234 opposite the first end 232, and a pusher body 236 extending between the first end 232 and the second end 234. The first end 232 of the pusher mechanism 230 may have a dome-shaped end 237 configured to contact and apply pressure to the storage pod 100. The pusher mechanism 230 may also have a grip portion 240 at the second end 234 with a width that is greater than the pusher body 236 to provide a region for a user to grasp the pusher 230 and apply the force onto the pod 100. Optionally, the grip portion 240 may act as a stop for the pusher mechanism 230 such that the grip portion 240 contacts the base 210 to prevent the pusher mechanism 230 from further downward movement and further crushing the pod 100. When collapsing the pod 100 the pusher 230 may travel a predetermined distance that is equal to the height of the pod 100. The pusher mechanism 230 may have a longitudinal axis 238 that may substantially align with the longitudinal axis 140 of the storage pod 100. In other examples, it is contemplated that the pusher mechanism 230 may be arranged at an acute angle that is within a range of 1 degree and 60 degrees to the longitudinal axis of the storage pod 100.

Figure 9A:
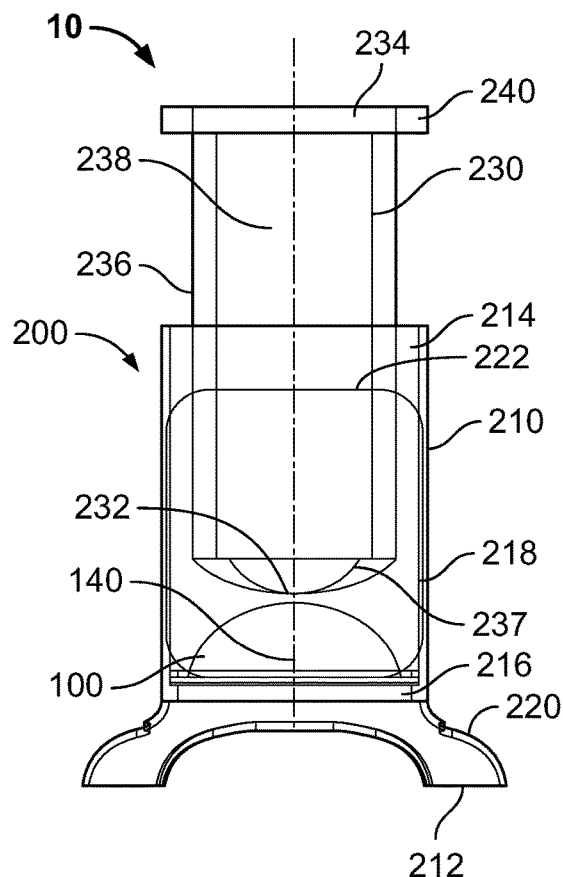
FIG. 9A illustrates a side view of an exemplary applicator system that expels the flowable material from an exemplary storage pod in a position prior to expelling the flowable material according to aspects described herein.
Figure 9B:
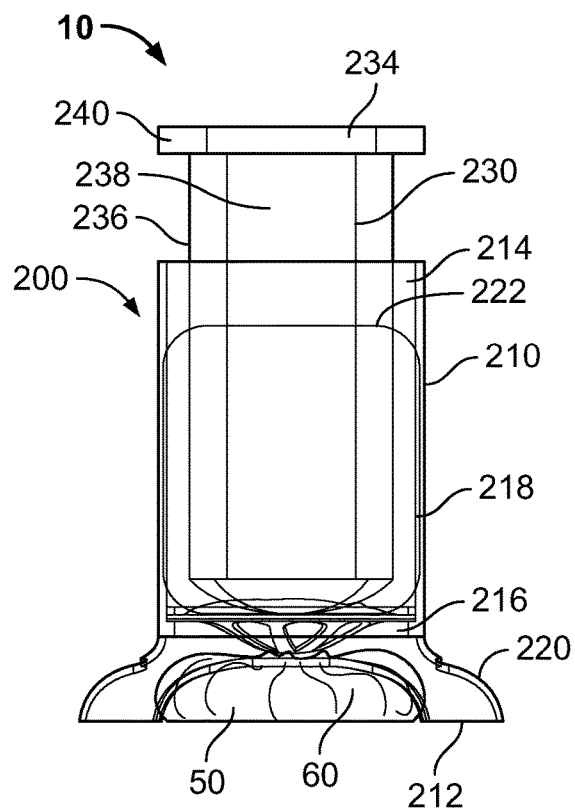
FIG. 9B illustrates a side view of an exemplary applicator system that expels the flowable material from an exemplary storage pod in a position after expelling the flowable material according to aspects described herein.
Figure 13:
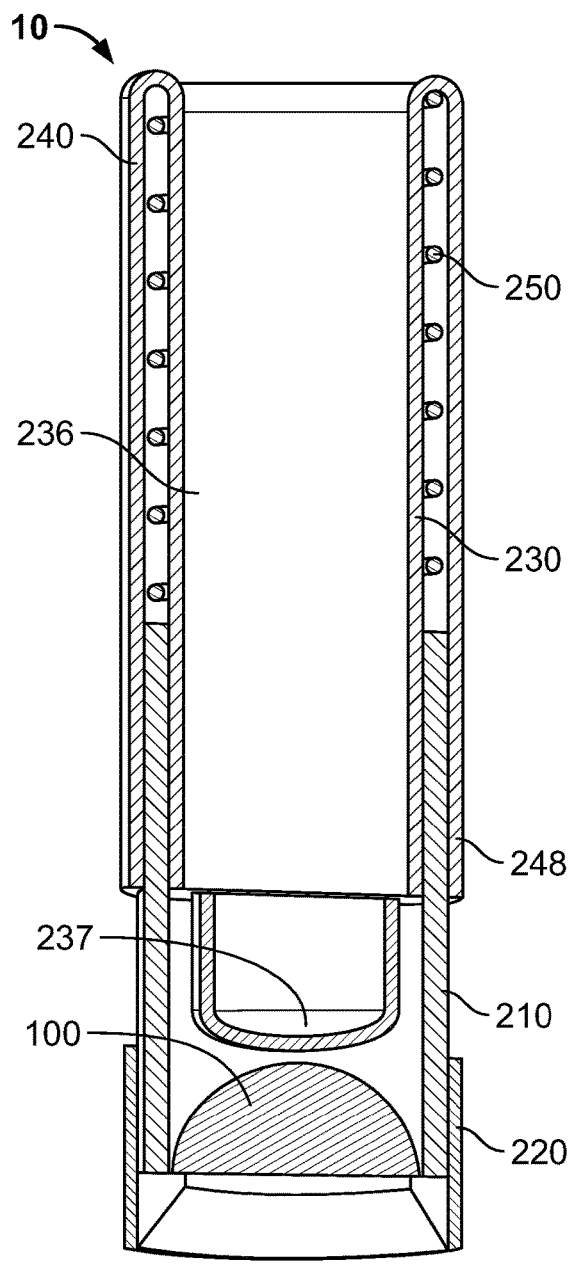
FIG. 13 illustrates a side cross-sectional view of an alternate exemplary applicator system of FIG. 9A according to aspects described herein.

Once a pod 100 is loaded and secured in the base 210, the pusher mechanism 230 may be lowered such that a first end 232 of the pusher mechanism 230 contacts the pod 100 to put the system 10 into a loaded position as shown in FIG. 9A. When an appropriate crushing force is applied by a user, the pusher mechanism 230 applies the crushing force in a normal direction to the top or peak of the upper portion 110 of the housing 108 causing the housing 108 to collapse. As the upper portion 110 collapses, the movement of the upper portion 110 pushes the flowable material 50 through the aperture 126 and also through an opening located within the base plate 216 to form a dollop 60 onto a surface as shown in FIG. 9B. As previously discussed, the dollop 60 has the predetermined shape depending upon the shape and size of aperture 126. In some examples, as shown in FIG. 13, the applicator 200 may also include a biasing member 250, or spring, connected between the pusher mechanism 230 and the base 210. The biasing member 250 may provide a return force upon the pusher mechanism 230 after application of the flowable material 50 to move the pusher mechanism 230 away from the base plate 216 and allowing the collapsed storage pod 100 to be easily removed from the applicator 200. In this example, the grip portion 240 of the pusher mechanism 230 may have a flange 248 that extends downward over the outer surface of the base 210. The flange 248 may have a receiver 252 that secures the biasing member 250 between the grip portion 240 and the base 210. The biasing member 250 then may apply the return force against the base 210 to put the pusher mechanism 230 in position to remove a used pod 100 or install an unused pod 100.

The base 210 may have a receiver 218 that extends from the base plate 216 to the second end 214 of the base 210. The receiver 218 may have a tubular body with a cylindrical walls extending from the base plate 216, such that the pusher mechanism 230 may be slidably engaged with the tubular body of the receiver 218. The base 210 may have an opening at the second end 214 that receives the pusher mechanism 230. In some examples, the base 210 may include a window 222 within the receiver 218. The window 222 may allow a user to visually see the pod 100 being crushed and also may allow the user to load an unused pod 100 into the receiver 218 and unload a used pod 100 from the base. The window 222 may have a substantially rectangular shape as shown in FIGS. 9A and 9B or may have any shape. The window 222, however, is optional and a completely opaque tubular body is also contemplated. In addition, the support member 220 may position the base 210 a predetermined distance from the surface 15 to allow the dollop 60 to form properly. In some examples, the support member 220 may be a plurality of legs that extend downward from the base plate 216 to the first end 212 of the base plate 216. The plurality of legs may be equally spaced around the perimeter of the base 210 at the first end 212, and each of the legs may extend outwardly as well as downwardly from the base plate 216 such that the support member 220 has an outer surface that is spaced outwardly from a perimeter of the base plate 216 to provide an effective width of the support member 220 that is greater than the width of the base 210. Alternatively, the support member 220 may be a single member that extends around a perimeter of the base 210 at the first end 212. When the support member 220 is a single member, the single member may be a flared member that extends outwardly and downwardly from the base plate 216 where the single member has a width that is greater than the width of the base plate 216.

Figure 10A:
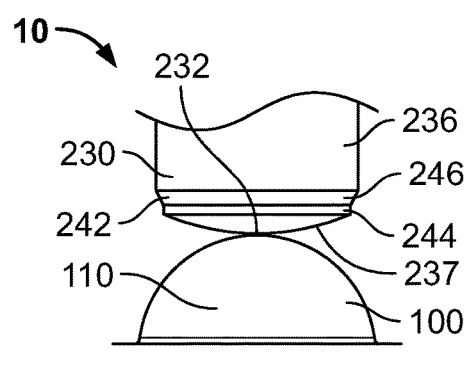
FIG. 10A illustrates an enlarged side view of the exemplary applicator system of FIG. 9A with an alternate pusher with a portion of the applicator removed for clarity according to aspects described herein.
Figure 10B:
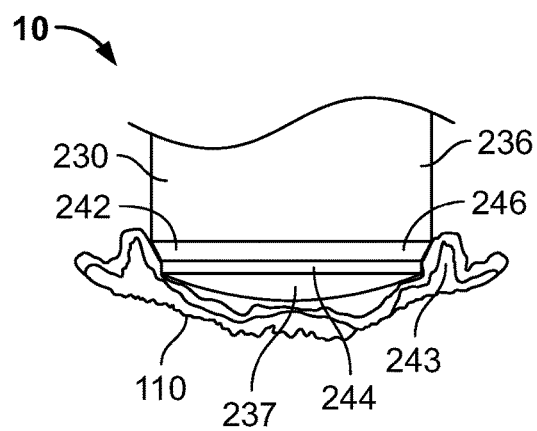
FIG. 10B illustrates an enlarged side view of the exemplary applicator system shown in FIG. 10A with a portion of the applicator removed for clarity according to aspects described herein.
Figure 11:
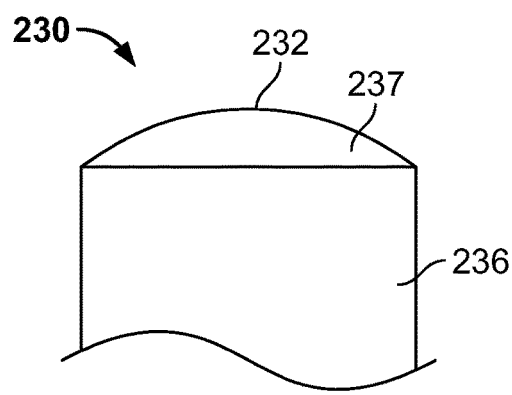
FIG. 11 illustrates an enlarged side view of a portion of an exemplary pusher of the exemplary applicator of FIG. 9A according to aspects described herein.
Figure 12:
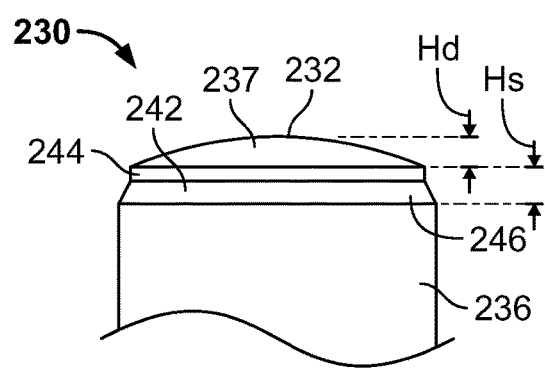
FIG. 12 illustrates an enlarged side view of a portion of an alternate exemplary pusher of the exemplary applicator of FIG. 9A according to aspects described herein.

As discussed above, the first end of the pusher mechanism 230 may have a dome-shaped end 237 or hemispherical end portion to help improve the efficiency of the application of the flowable material 50 to the substrate. The dome shape of the end portion 237 may help to expel at least 80 percent, or in some examples, at least 90 percent of the flowable material 50 through the aperture 126, while also applying centrally located pressure to cause the flowable material 50 to spread out and securely bond to the substrate. When the flowable material 50 is successfully adhered to the substrate, the gel 50 will not stick to the pusher mechanism 230 when the pusher mechanism 230 is pulled away. As shown in FIG. 10B, the dome-shaped end 237 may deflect inner layer 124 to match the curvature of end 237. The shape end portion 237 of the pusher 230 may help to ensure a maximum amount of gel 50 is expelled from the pod 100. In some examples, as shown in FIG. 11, the dome-shaped end 237 may have the same width as the pusher body 236. As another option, as shown in FIGS. 10A and 12, the dome-shaped end 237 may have a width that is less than a width of the pusher body 236 to form a stepped portion 242 adjacent the dome-shaped end 237. The stepped portion 242 may extend between the dome-shaped end 237 and the pusher body 236, where the stepped portion 242 may include a vertical step 244 that extends in a direction substantially parallel with the longitudinal axis 238 of the pusher mechanism 230 and then a tapered surface 246 extending from an edge of the vertical step 244 to the pusher body 236. This stepped portion 242 may provide an alcove 243 around the perimeter of the dome-shaped end 237 of the pusher 230 within the base 210 to receive a portion of the upper portion 110 of the pod 100 as the pusher 230 collapses the upper portion 110 expelling the flowable material 50 as shown in FIG. 10B. The dome-shaped end 237 may help to prevent any accumulation of flowable material 50 within the alcove 243 when it is applied to the substrate. The radius of the dome-shaped end 237 may be greater than the width of the pusher body 236. In addition, the width of the dome-shaped end 237 may be approximately 92% of the width of the pusher body 236, or within a range of 80% and 95% of the width of the pusher body 236. The stepped portion 242 may have a height that is greater than a height of the dome-shaped end 237, where the height, Hd, of the dome-shaped end 237 is defined by the perpendicular distance from a peak of the dome-shaped end 237 to an edge of the dome-shaped end 237 and where the height, Hs, of the stepped portion 242 is defined by a perpendicular distance from an edge of the dome-shaped end 237 and an edge where the stepped portion 242 intersects the pusher body 236. In some examples, a ratio of the height, Hs, of the stepped portion 242 to the height, Hd, of the dome-shaped end 237 may be 1.8:1.0, or within a range of 2.0:1.0 and 1.5:1.0. Alternatively, the first end 232 of the pusher mechanism 230 may be have a different shaped end, such as a conical-shaped end, flat end, multifaceted pyramidal-shaped end, a bell shape, or other geometric shape.

Figure 14:
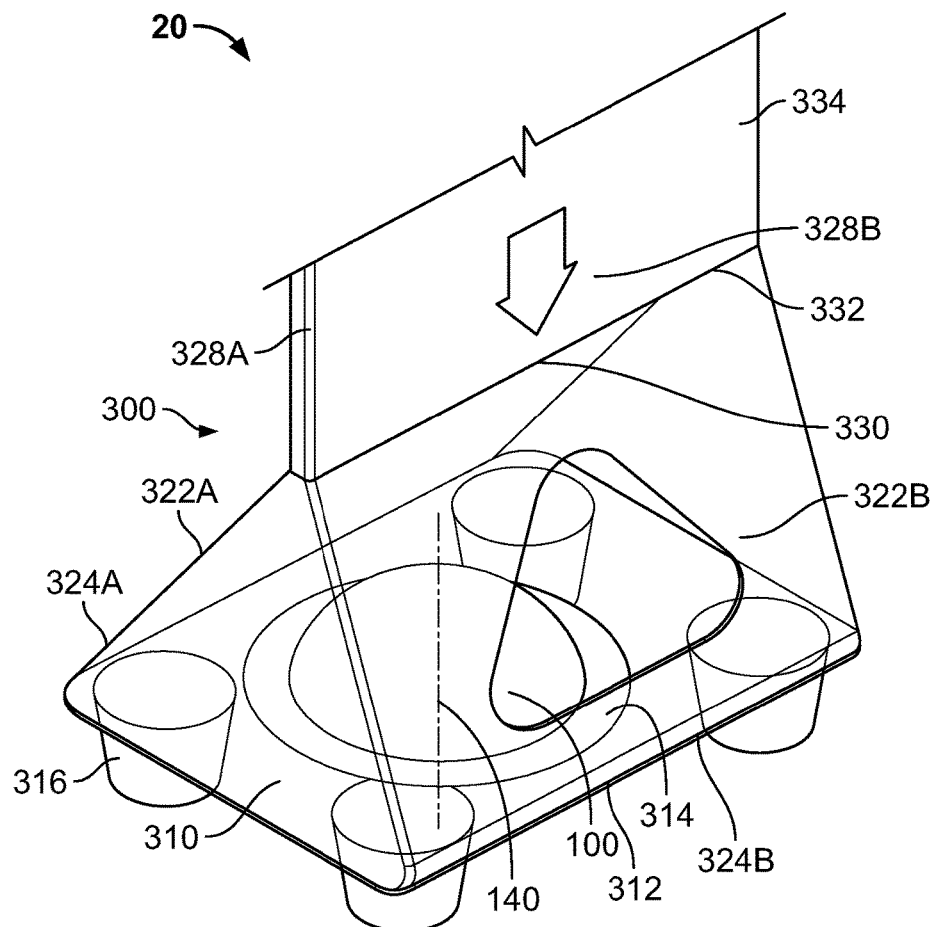
FIG. 14 illustrates a perspective view of another exemplary applicator system that expels flowable material from an exemplary storage pod in a position prior to expelling the flowable material according to aspects described herein.
Figure 15:
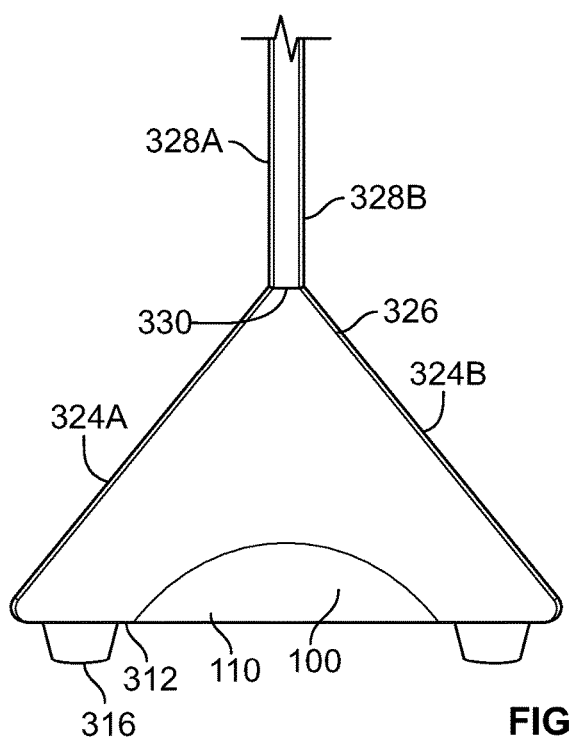
FIG. 15 illustrates a side view of the exemplary applicator system of FIG. 14 according to aspects described herein.
Figure 16:
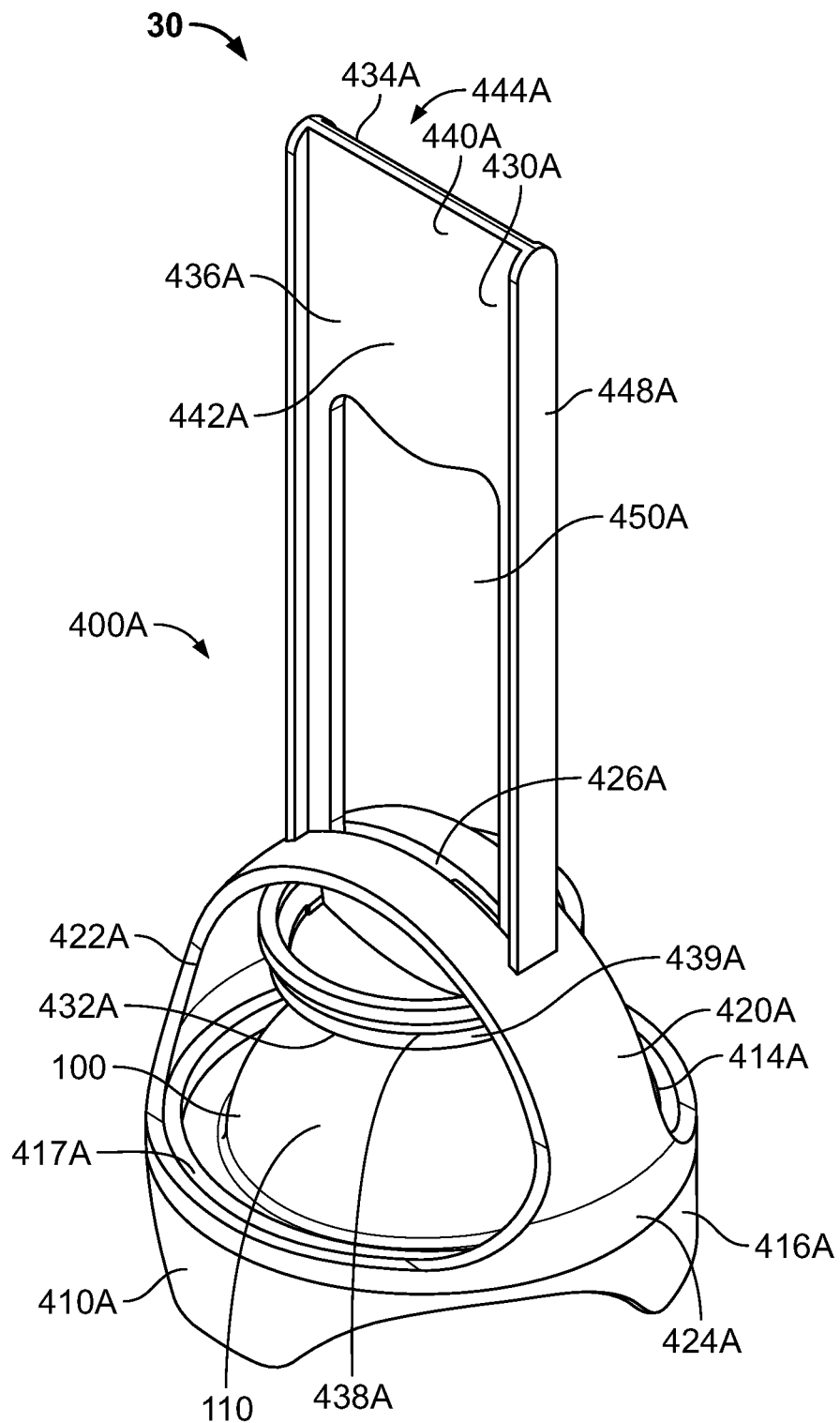
FIG. 16 illustrates a perspective view of another exemplary applicator system that expels flowable material from an exemplary storage pod in a position prior to expelling the flowable material according to aspects described herein.
Figure 17:
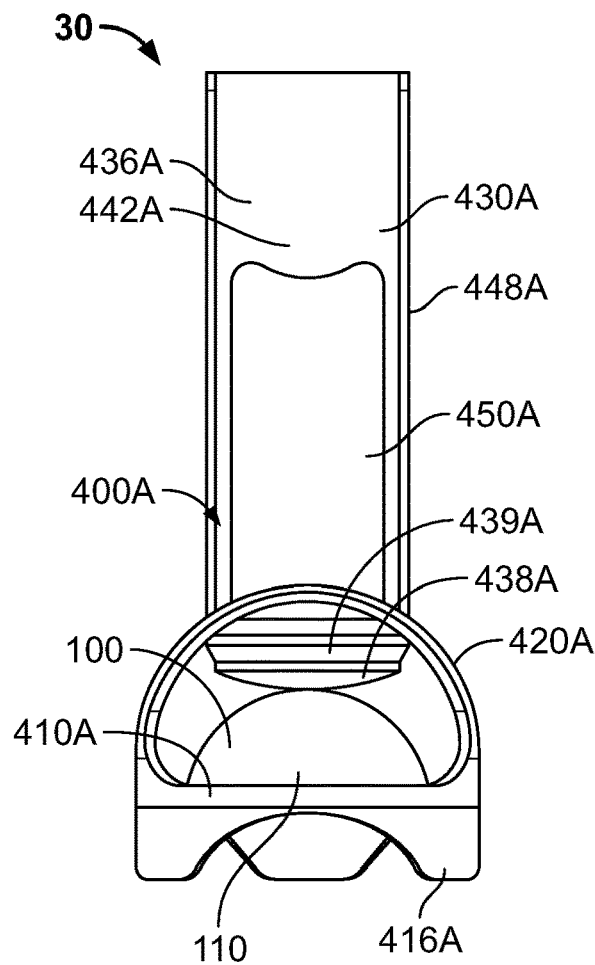
FIG. 17 illustrates a side view of the exemplary applicator system of FIG. 16 according to aspects described herein.

FIGS. 14-15 illustrate another exemplary system 20 for dispensing the flowable material 50 from a storage pod 100 that uses a single use applicator 300. Applicator 300 may include a base 310 that holds a storage pod 100. The base 310 may include a base plate 312, a receiver 314 to secure the storage pod 100 to the base 310, a support member, or plurality of support members, 316 that extend from the base plate 312 to position the base plate 312 a predetermined distance from the surface 15 receiving the flowable material 50. The base 310 may also include a pusher mechanism 330 that can transmit a force from a user to collapse the housing 108 of the pod 100 and expel the flowable material 50 from the pod 100. The base 310 may include a pair of arms 322A, 322B that are foldably engaged with the base plate 312. Each arm 322A, 322B may be engaged with the base plate 312 on opposite sides of the base plate 312. The first arm 322A may rotate toward the second arm 322B along fold line 324A at a first side of the base plate 312, and the second arm 322B may rotate toward the first arm 322A along fold line 324B. Each arm 322A 322B may have a similar size such that each of the arms 322A, 322B have an inner surface region 326 that contacts a portion of the upper portion 110 of the pod 100 when the arms 322A, 322B are folded towards each other. In addition, each arm 322A, 322B may have a handle portion 328 that extends from a fold line 332 in a direction substantially perpendicular to the base plate 312. Fold line 332 may be spaced a predetermined distance from the fold line 324. In some examples, the handle portion 328 may have corresponding features that either may join handle portion 328A of arm 322A to handle portion 328B of arm 322B together. The joined handle portions 328A, 328B may provide a grip 334 to allow a user to grasp and exert an appropriate crushing force through the grip 334 where the inner surface region 326 of each arm 322A, 322B to collapse the housing 108 and push the flowable material 50 through the aperture 126 and also through an opening 318 located within the base 310. The extruded flowable material 50 then forms a dollop 60 onto the surface, where the dollop 60 has the predetermined shape depending upon the shape and size of aperture 126 as described above. In some examples, the receiver 314 may be a recess within the base plate 312 to receive the pod 100, or in other examples, the receiver 314 may be a protrusion extends from the base plate 312 to secure the pod 100 in the applicator 300. In addition, the base 310 may have an opening in the base plate 312 through which the flowable material 50 passes when expelled from the storage pod 100.

Applicator 300 may be disposable such that the base 310 may be formed such that the base plate 312, arms 322A, 322B, support members 316, and handle portions 328 are formed as a single unitary member. Applicator 300 may include the storage pod 100 already installed such that a user would only need to remove the outer layer 122 to make the system 20 ready to use. The base 310 may be formed from a paper-based material, such as but not limited to cardboard or molded pulp. Optionally, the base 310 may be formed from a polymeric material, such as a thermoformed polymer.

In operation, to dispense the flowable material 50, the outer layer 122 of the lid 120 may be removed from the storage pod 100. Next, the storage pod 100 may be secured in the receiver of the applicator, where the flange 112 contacts the base plate of the applicator and the upper portion 110 extends upward away from the base plate. The support member may then be placed against the surface receiving the flowable material to position the base plate a predetermined distance from the surface. A user may then apply a force to a pusher mechanism of the applicator, where the force presses the pusher mechanism onto the upper portion 110 of housing 108 causing the pod 100 to collapse. As the pod 100 collapses, the flowable material 50 is extruded through the aperture 126.

While single use system 20 discussed above utilizes an applicator 300 formed as a unitary member, FIGS. 16-30F illustrate alternative examples of an applicator that may be used for a dispenser system 30 that could be a single use dispenser system, where the applicator and a dispensed (i.e. collapsed) pod is discarded after a single use, or a multiple use system with an applicator that allows a dispensed (i.e. collapsed) pod is removed after use and an unused pod 100 can be installed into the applicator. The applicator has a separately formed pusher that slidably engages a guide member to collapse the storage pod and expel the flowable material onto the desired substrate. In these examples, the system 30 may include an applicator for dispensing the flowable material from a storage pod. As discussed above, a pusher may receive a force from a user to collapse the pod, which expels the flowable material from the pod. As described herein, system 30 may include one of or a combination of any of the multiple illustrated arrangements described below and shown in FIGS. 16-20, FIGS. 21-23, FIGS. 24-25, FIGS. 26-27, and FIGS. 28-29, which relate to exemplary applicators 400A-400E. Each of the exemplary applicators 400A-400E described below may operate similarly with a pusher that is slidably engaged with a guide member that exerts a force on a pod 100 that is secured within a receiver of the applicator to expel the flowable material 50 onto a substrate. Similar reference numbers are used in FIGS. 16-30F to illustrate similar or identical components and features shown in various examples. As such, certain features of the applicators 400B-400E that are described below with respect to applicator 400A of FIGS. 16-20 may be described in lesser detail, or may not be described at all as the descriptions herein apply to similar or identical components and features.

In FIGS. 16-20, applicator 400A may include a base 410A that holds a storage pod 100. The base 410A may include a base plate 412A, an opening 413A extending through the base plate 412A, a receiver 414A to secure the storage pod 100 to the base 410A, a support member, or plurality of support members 416A that extend downward from the base plate 412A to position the base plate 412A a predetermined distance from the target surface that receives the flowable material 50. In some examples, the receiver 414A may include a lip 417A that extends upward from the base plate 412A that generally follows the perimeter shape of the pod 100, but it slightly larger to allow the pod 100 to have sliding fit within the receiver. The lip 417A may be a continuous lip as shown in the illustrated examples or the lip 417A may be intermittent where the lip 417A has gaps or openings around its perimeter. These gaps may help to save on the amount of material used for the applicator 400A A guide member 420A may releasably or permanently connect to the base 410A, where the guide member 420A includes a body member 422A that acts as a retainer to keep the pod 100 within the applicator 400A, an engaging member 424A to connect to the base plate 412A, and a guide opening 426A that receives and guides the movement of a pusher 430A. In some examples, the guide member 420A may be integrally formed with the base 410A as a single member. The body member 422A may have a dome-shaped portion that may have a radius larger than the pod 100 to allow the user to place the pod 100 within the body member 422A. The pusher 430A may be a piston and have a first end 432A, a second end 434A opposite the first end 432A, and a pusher body 436A extending between the first end 432A and the second end 434A. The first end 432A of the pusher 430A may have a dome-shaped end 438A at the first end 432A that is configured to contact and apply pressure to the storage pod 100. The pusher 430A may also have a grip portion 440A at or near the second end 434A. The grip portion 440A provides a region for a user to grasp the pusher 430A and apply the force onto the pod 100 to expel the flowable material 50.

The pusher body 436A may have a substantially plate-like shape with a rectangular cross-sectional shape. The pusher body 436A may include a front surface 442A, a rear surface 444A opposite the front surface 442A, a pair of side ribs 448A, and an opening 450A that extends through both the front and rear surfaces 442A, 444A. The side ribs 448A may have a thickness that is greater than a width of the majority of the pusher body 436A (i.e. the distance from the front surface 442A to the rear surface 444A). The ribs 448A may provide additional stiffness to the pusher 430A to ensure it transmits the force applied by a user to collapse the pod 100. The guide opening 426A may extend through the guide member 420A and may have a shape that generally corresponds to shape to the cross-sectional profile of the pusher body 436A, but is slightly larger to allow for a sliding fit between the pusher body 436A and the guide opening 426A. In this example, the guide opening 426A may have a narrow central region and wider end regions to allow for the side ribs 448A to slide through the guide opening 426A.

Figure 18:
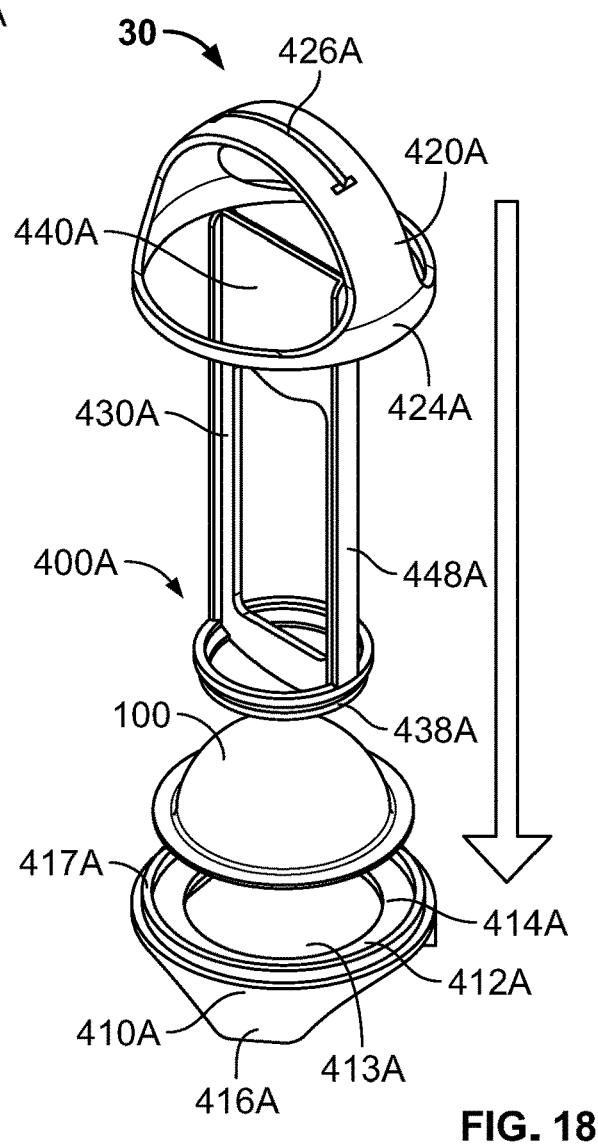
FIG. 18 illustrates an exploded perspective view of the exemplary applicator system of FIG. 16 according to aspects described herein.
Figure 19:
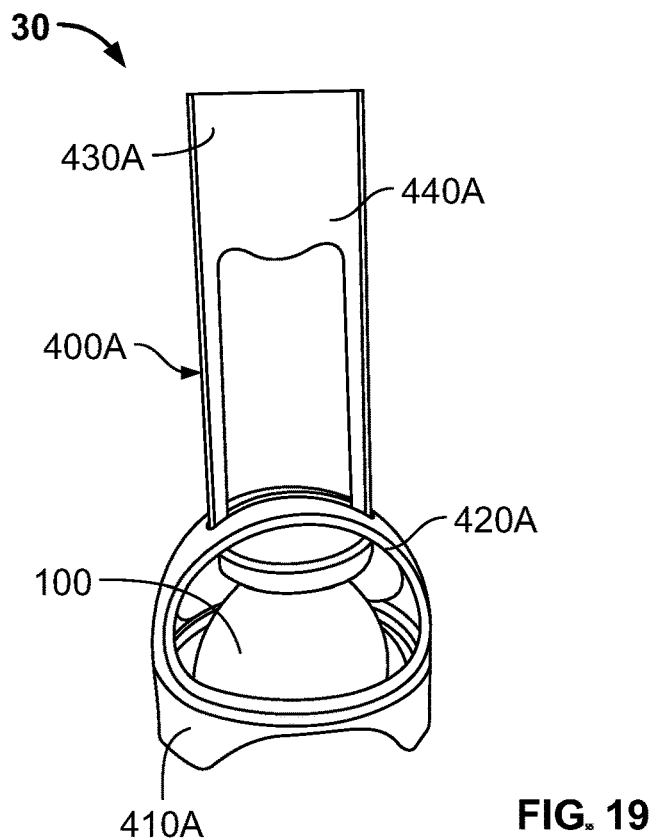
FIG. 19 illustrates a perspective view of the exemplary applicator system of FIG. 16 prior to expelling the flowable material from an exemplary storage pod according to aspects described herein.
Figure 20:
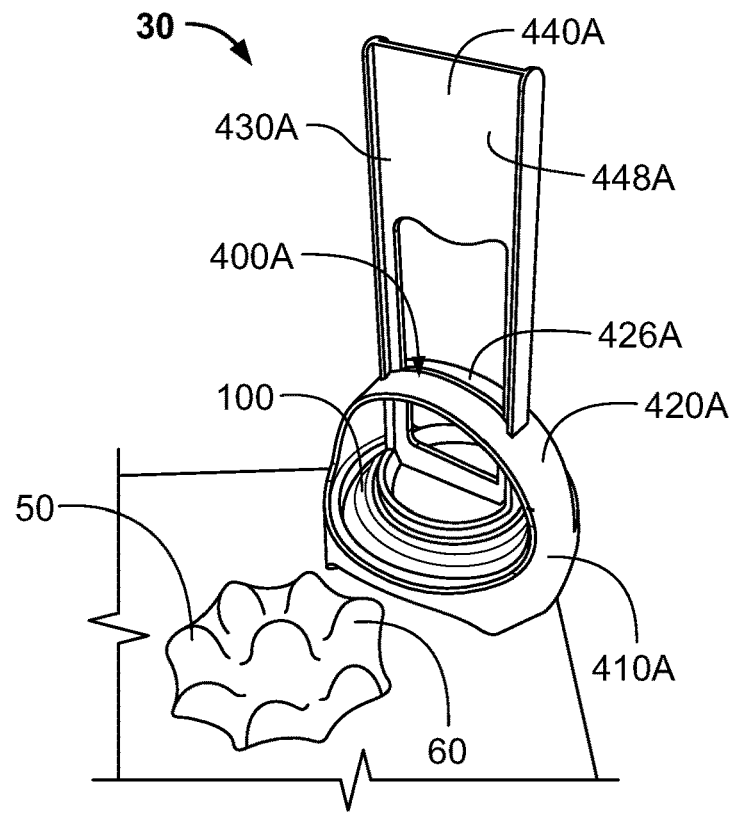
FIG. 20 illustrates a perspective view of the exemplary applicator system of FIG. 16 after the flowable material has been expelled according to aspects described herein.

As shown in FIG. 18, the system 30 may be assembled as a single unit to provide an applicator for the system 30, which can be used as a single use applicator or reloaded by the user for multiple uses over time. The system 30 may be assembled by installing the pod 100 into the receiver 414A of the base 410A. Next, the pusher 430A may be installed into the guide member 420A by inserting the pusher 430A through the guide opening 426A. The second end 434A may be inserted into the guide opening 426A first, where the first end 432A or a portion of the pusher body 436A nearer the first end 432A may act as a stop to help secure the pusher 430A. After the pusher 430A is installed into the guide member 420A, the engaging member 424A of the guide member 420A connects (i.e. either releasably or permanently) to the base 410A. For instance, the engaging member 424A may connect to the base 410A using a snap-fit type connection, adhesive, a threaded connection, or other connection methods. Once the guide member 420A is attached to the base 410A, the system 30 is ready for use.

Figure 21:
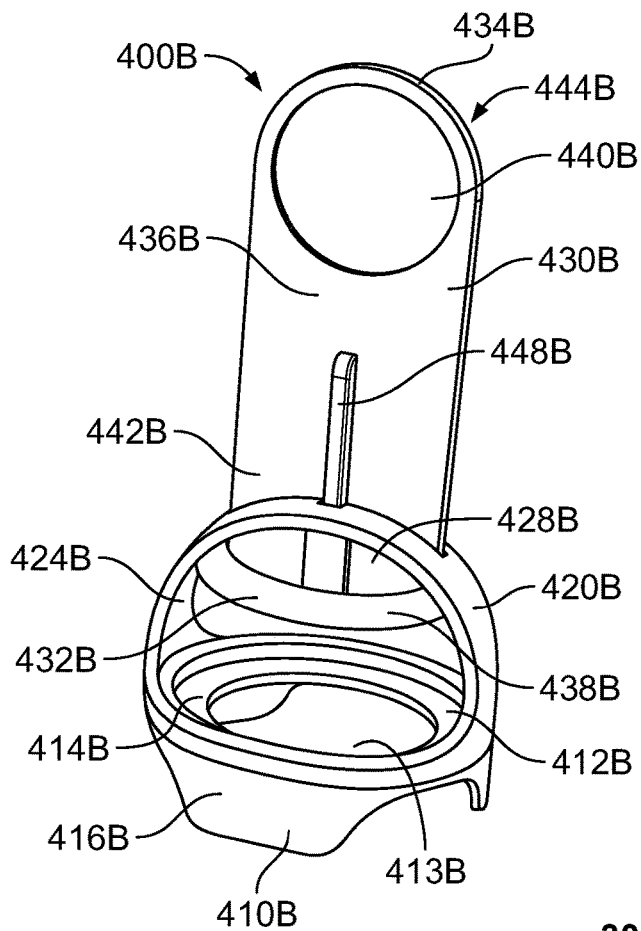
FIG. 21 illustrates a perspective view of another exemplary applicator that expels flowable material from an exemplary storage pod according to aspects described herein.
Figure 22A:
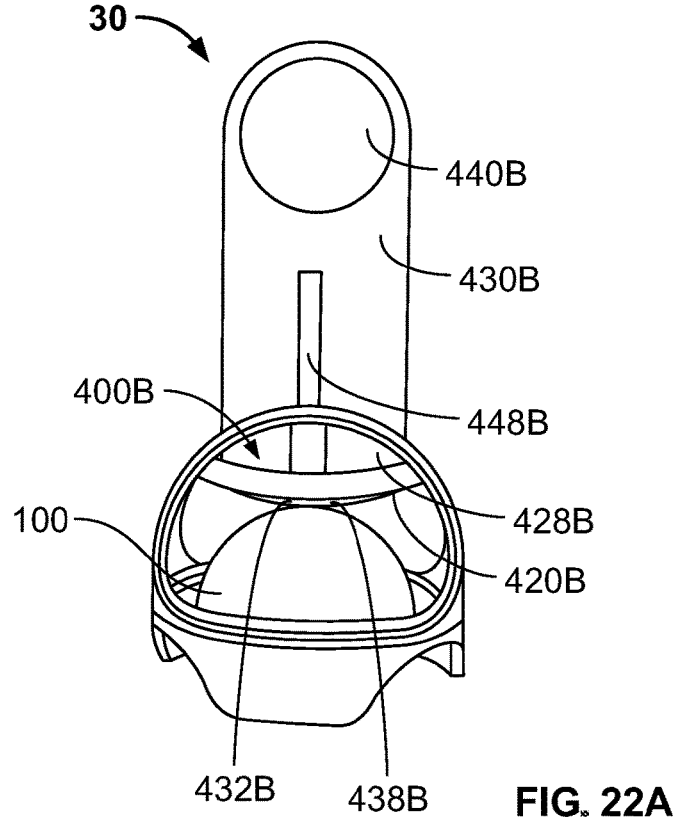
FIG. 22A illustrates a side view of the exemplary applicator system with the applicator of FIG. 21 prior to expelling the flowable material from an exemplary storage pod according to aspects described herein.
Figure 22B:
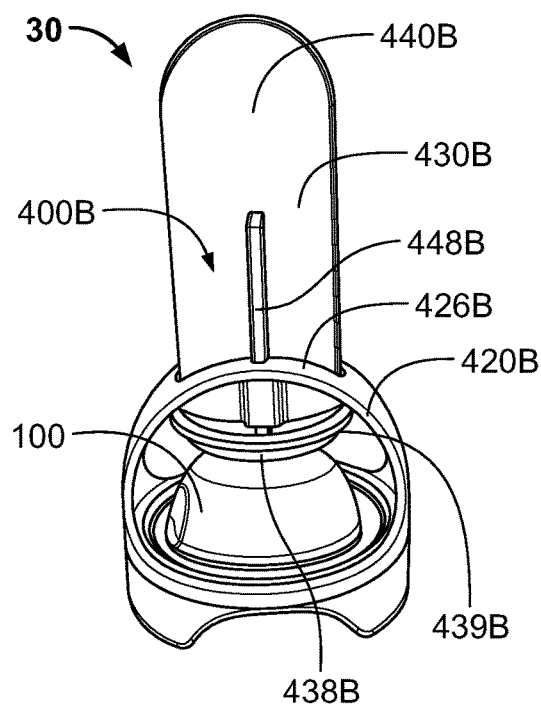
FIG. 22B illustrates a perspective view of the exemplary applicator system of FIG. 22A prior to expelling the flowable material from an exemplary storage pod according to aspects described herein.
Figure 23:
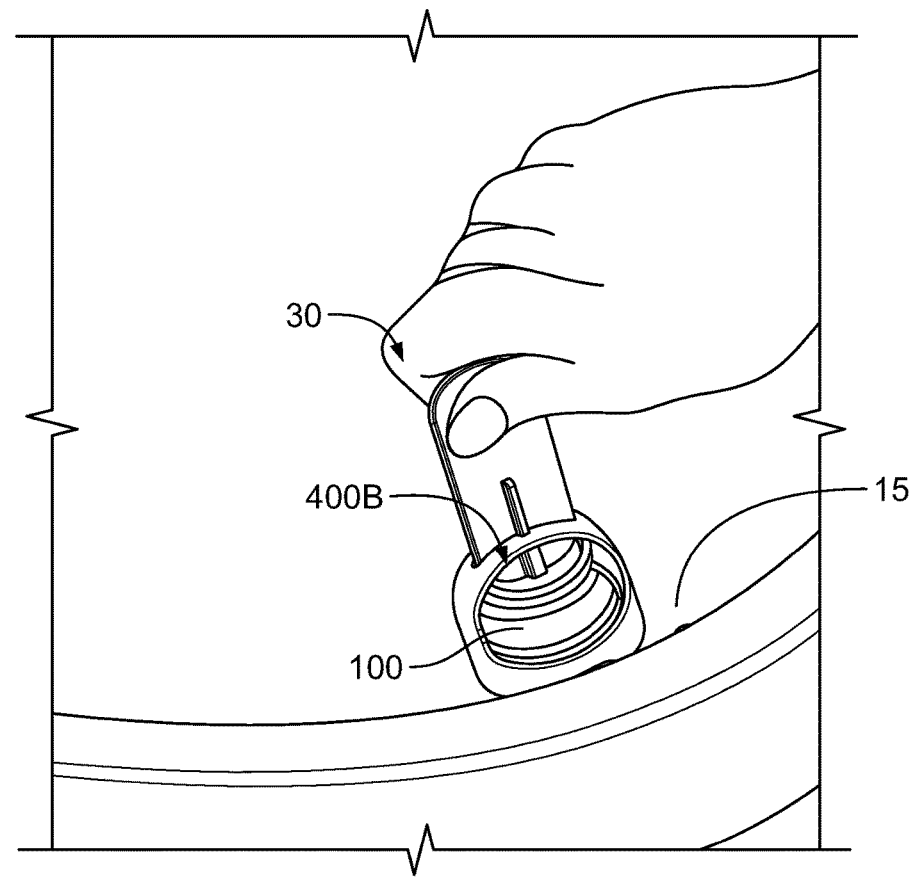
FIG. 23 illustrates a perspective view of the exemplary applicator system of FIG. 22A prior to expelling the flowable material from an exemplary storage pod onto a surface of a toilet bowl according to aspects described herein.

FIGS. 21-23 illustrate another exemplary system 30 that includes applicator 400B and with a base 410B, that includes a base plate 412B, an opening 413B extending through the base plate 412B, a receiver 414B that secures a pod 100, a guide member 420B, a pusher 430B that is received in guide opening 426B. The pusher body 436B may have a substantially plate-like shape with a front surface 442B, a rear surface 444B opposite the front surface 442B, and a perimeter surface 446B extending between the front and rear surfaces 442B, 444B. A support rib 448B may be extend from the first end 432B (i.e. the dome-shaped end 438B) towards the second end 434B of the pusher body 436B along each of the front and rear surface 442B, 444B. Each support rib 448B may have a length of at least 40 percent of a length of the pusher body 436B (i.e. a distance between the first end 432B and the second end 434B), or in some examples, each support rib 448B may have a length of at least 50 percent of a length of the pusher body 436B. Each rib 448B may be substantially centered on the front and rear surface 442B, 444B and may have a width near the first end 432B that is greater than a width near an end of the rib 448B. This width differential of the ribs 448B may be a result of a tapered width or may be a result of a stepped width such that the width on each side of the step is different. The grip portion 440B may have a rounded upper portion.

The guide member 420B may include a central support member 428B positioned below the dome-shaped portion of the guide member body 422B. The central support member 428B may help to stabilize and support the pusher 430B as it moves along the guide opening 426B. Guide opening 426B may generally correspond in shape to the cross-sectional profile of the pusher body 436B, but slightly larger to allow for a sliding fit between the pusher body 436B and the guide opening 426B. In this example, the guide opening 426B may have a wider central region to allow for the ribs 448B to slide through the opening with narrower end regions. The dome-shaped end 438B of the pusher 430B may be smooth surface with a curved rounded outer edge. Alternatively, the dome-shaped end 438B may have a textured surface, or have a stepped portion, similar to the dome-shaped end of other pushers described herein. FIG. 23 illustrates the applicator 400B in use to expel the flowable material from pod 100 onto an inner surface 15 of a toilet bowl.

Figure 24:
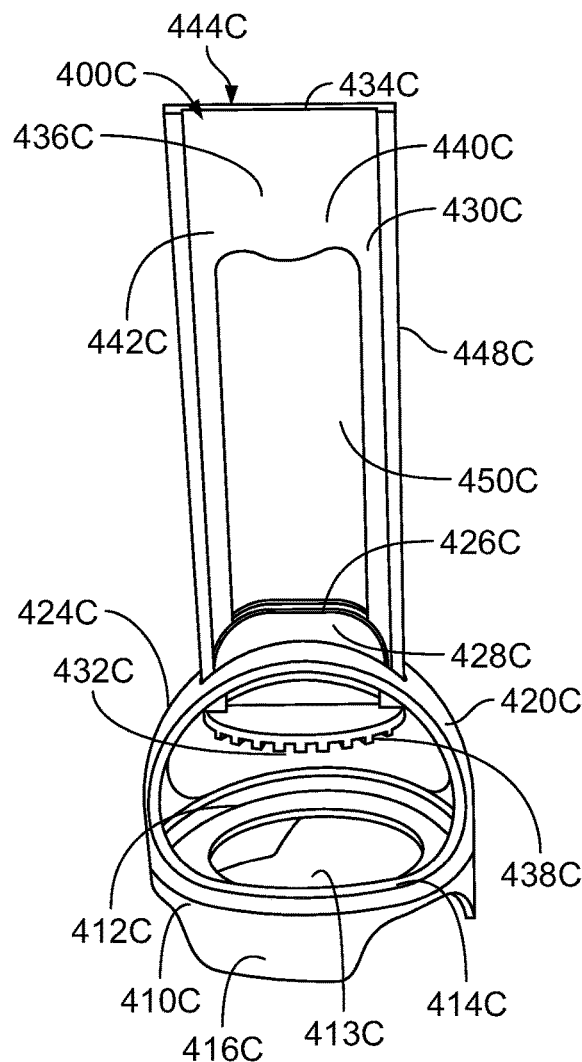
FIG. 24 illustrates a perspective view of another exemplary applicator that expels flowable material from an exemplary storage pod according to aspects described herein.
Figure 25:
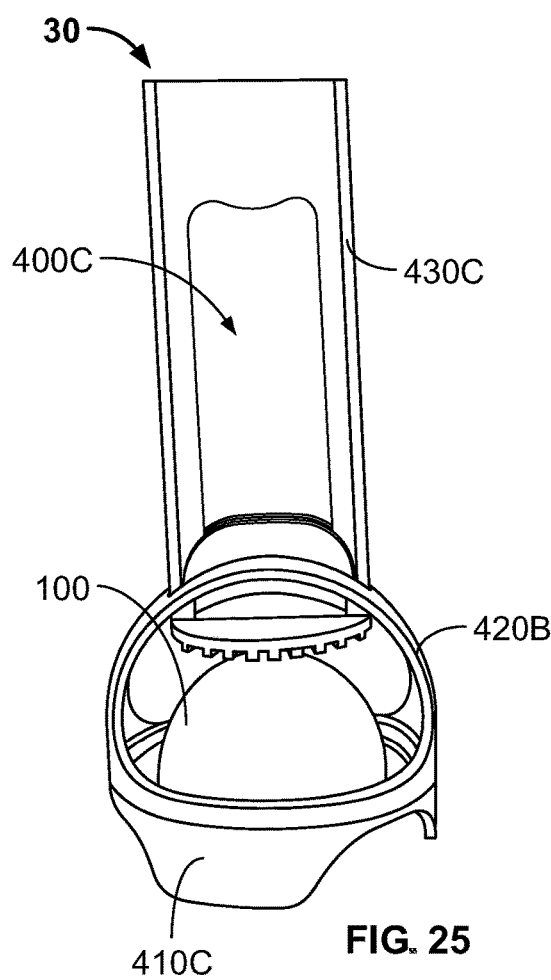
FIG. 25 illustrates a perspective view of an exemplary applicator system with the applicator of FIG. 24 prior to expelling the flowable material from an exemplary storage pod according to aspects described herein.

FIGS. 24 and 25 illustrate an exemplary system 30 that includes applicator 400C and with a base 410C that includes a base plate 412C, an opening 413C extending through the base plate 412C, a retainer 414C that secures a pod 100, a guide member 420C, a pusher 430C that is received in guide opening 426C. The pusher body 436C may have a substantially plate-like shape with a front surface 442C, a rear surface 444C opposite the front surface 442C, a pair of side ribs 448C arranged along each side of the pusher body 436C, and an opening 450C that extends through both the front and rear surfaces 442C, 444C. The side ribs 448C may have a thickness that is greater than a thickness of the majority of the pusher body 436C (i.e. the distance from the front surface 442C to the rear surface 444C). The guide member 420C may include a central support member 428C above and below the dome-shaped portion of the guide member body 422C. The central support member 428C may have a width above the dome-shaped portion that is substantially the same as the width of the front and rear surfaces 442C, 444C. The guide opening 426C may extend through the central support member 428C and may have a shape that generally corresponds to shape to the cross-sectional profile of the pusher body 436C, but is slightly larger to allow for a sliding fit between the pusher body 436C and the guide opening 426C. In this example, the guide opening 426C may have wider end regions and a narrower central region to allow for the side ribs 448C to slide through the guide opening 426C. While the dome-shaped end 438C of the pusher 430C may be any of the dome-shaped ends described herein, FIGS. 24 and 25 illustrate a dome-shaped end 438C with a textured end, where the textured end includes a plurality of ribs or grooves.

Figure 26:
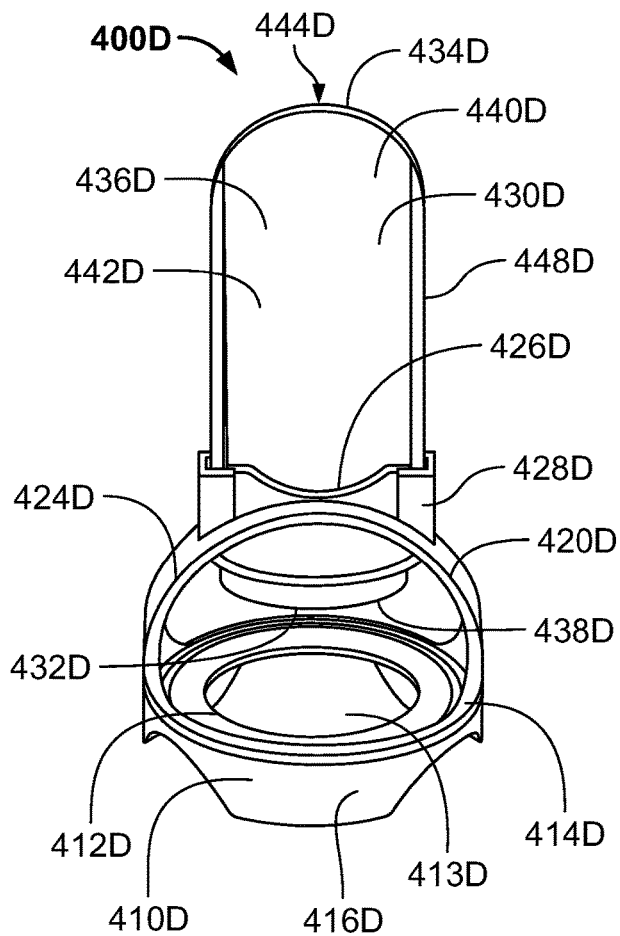
FIG. 26 illustrates a perspective view of another exemplary applicator that expels flowable material from an exemplary storage pod according to aspects described herein.
Figure 27:
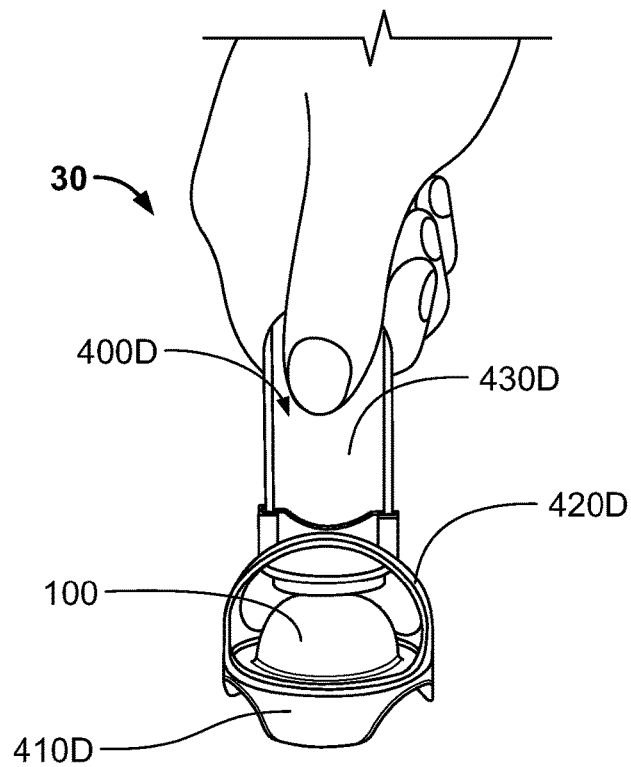
FIG. 27 illustrates a perspective view of the exemplary applicator system with the applicator of FIG. 26 prior to expelling the flowable material from an exemplary storage pod according to aspects described herein.

FIGS. 26 and 27 illustrate another exemplary system 30 that includes applicator 400D with a base 412D410D that includes a base plate 410D, an opening 413D extending through the base plate 412D, a retainer 414D that secures a pod 100, a guide member 420D, and a pusher 430D that is received in guide opening 426D. The pusher body 436D may have a substantially plate-like shape with a front surface 442D, a rear surface 444D opposite the front surface 442D, and a pair of side ribs 448D. The side ribs 448D may have a thickness that is greater than a thickness of the majority of the pusher body 436D (i.e. the distance from the front surface 442D to the rear surface 444D). The guide member 420D may include a central support member 428D above and below the dome-shaped portion of the guide member body 422D. The central support member 428D may have a width above the dome-shaped portion that greater than an entire width of the pusher body 436D (i.e. the distance from an outward facing surface of a first side rib 448D to an outward facing surface of the second side rib 448D). The guide opening 426D may extend through the central support member 428D and may have a shape that generally corresponds to shape to the cross-sectional profile of the pusher body 436D, but is slightly larger to allow for a sliding fit between the pusher body 436D and the guide opening 426D. In this example, the guide opening 426D may have wider end regions to allow for the side ribs 448D to slide through the opening with a narrower central region. While the dome-shaped end 438D of the pusher 430D may be any of the dome-shaped ends described herein, FIGS. 26 and 27 illustrate a dome-shaped end 438D with a stepped portion 439D.

Figure 28:
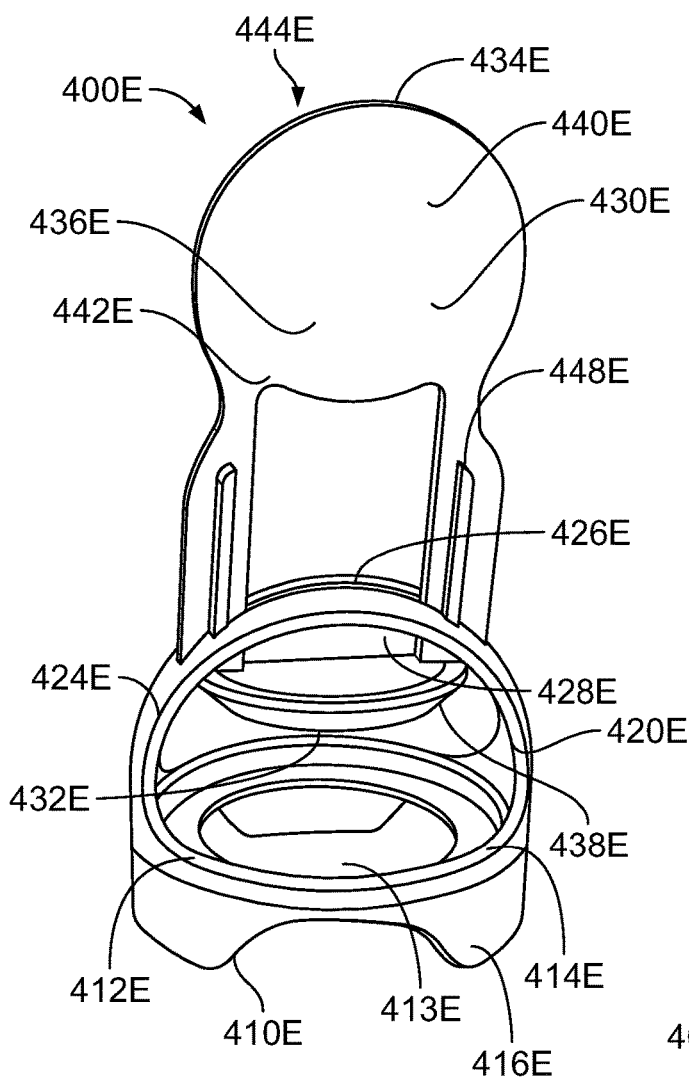
FIG. 28 illustrates a perspective view of another exemplary applicator that expels flowable material from an exemplary storage pod according to aspects described herein.
Figure 29:
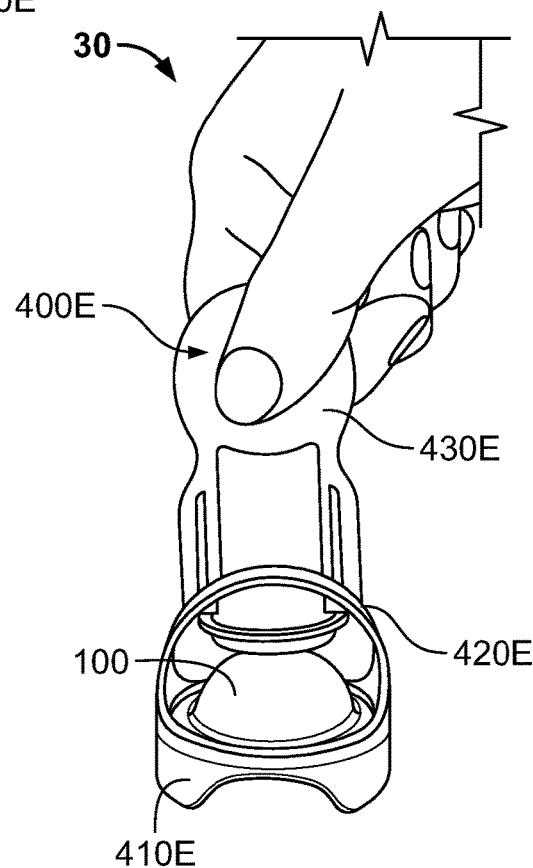
FIG. 29 illustrates a perspective view of the exemplary applicator system with the applicator of FIG. 28 prior to expelling the flowable material from an exemplary storage pod according to aspects described herein.

FIGS. 28 and 29 illustrate an exemplary system 30 that includes applicator 400E with a base 410E that includes a base plate 412E, an opening 413E extending through the base plate 412E, a retainer 414E that secures a pod 100, a guide member 420E, and a pusher 430E that is received in guide opening 426E. The pusher body 436E may have a front surface 442E, a rear surface 444E opposite the front surface 442E, a rounded grip portion 440E, a pair of ribs 448E arranged on each of the front and rear surfaces 442E, 444E, and an opening 450E extending through the front and rear surfaces 442E, 444E. Each pair of ribs 448E may be spaced apart from each other on the front surface 442E and the rear surface 444E. The pair of ribs 448E may be arranged opposite each other. The guide member 420E may include a central support member 428E below the dome-shaped portion of the guide member body 422E. The central support member 428E may have a width below the dome-shaped portion that encompasses the ribs 448E, but is less than an entire width of the pusher body 436E. The guide opening 426E may extend through the central support member 428E and may have a shape that generally corresponds to shape to the cross-sectional profile of the pusher body 436E, but is slightly larger to allow for a sliding fit between the pusher body 436E and the guide opening 426E. In this example, the guide opening 426E may have a narrow central region with wider regions near the ends to allow for the ribs 448D to slide through the guide opening 426E and then narrow again near the end regions. While the dome-shaped end 438E of pusher 430E may be any of the dome-shaped ends described herein, FIGS. 28 and 29 illustrate a dome-shaped end 438E with a stepped portion 439E.

FIGS. 30A-30F illustrate the system 30 with applicator 400B dispensing the flowable material 50. As discussed above, the system 30 may include the pod 100 secured in the receiver 414B of the applicator 400B. While not shown, the outer layer 122 of the lid 120 may first be removed prior to placing the applicator 400A onto the target surface. As shown in FIG. 30A, the applicator 400B may be placed on the target surface with the plurality of support members 416B resting on the target surface. FIGS. 30B-D illustrate the upper portion 110 of the pod 100 being collapsed by the pusher 430B as a user applies a downward force onto the pusher 430B. As shown in the FIG. as the upper portion 110 of the pod 100 begins to collapse, the flowable material is expelled through aperture between the base plate 412B and the target surface. FIG. 30D illustrates upper portion 110 of the pod 100 fully collapsed by the pusher 430B and the flowable material 50 is expelled forming the dollop 60. FIG. 30E shows a user pulling the pusher 430B upward to where the rear of the pusher 430B contacts the guide member 420B, which helps to pull the applicator 400B away from the collapsed pod 100 and also from the surface 15. FIG. 30F illustrates the formed dollop of the flowable material 50 after the applicator 400B is removed, where the flowable material 50 may now work to disinfect and clean the surface as designed.

Applicators 400A-E may be disposable such that their corresponding bases 410A-E, guide members 420A-E, and pushers 430A-E may be formed from a paper-based material, such as but not limited to cardboard or molded pulp, or may be formed from a polymeric material, such as a thermoformed polymer. As discussed above, applicators 400A-E may be assembled to include the storage pod 100 such that a user would only need to remove the outer layer 122 to make the system 30 ready to use. In addition, applicators 400A-E may be constructed of any of the material options described above with respect to previously described applicators 200, 300.

While single use system 20 discussed above utilizes applicator 200 formed as a unitary member that collapses a pod 100. FIGS. 31A-33C illustrate alternative examples for a single use dispenser, where each applicator 500A-500C may include a storage area to contain the flowable material. The flowable material may be expelled through an aperture in a lower member of the applicator onto the desired substrate. In these examples, the system 40 may include a single use applicator for dispensing the flowable material 50 from a storage area within the applicator. As described herein, system 40 may include one of or a combination of any of the multiple illustrated arrangements described below and shown in FIGS. 31A-31C, FIGS. 32A-32C, and FIGS. 33A-33C, which relate to exemplary applicators 500A-500C. Each of the exemplary applicators 500A-500C of system 40 described below may operate similarly with a handle that collapses an upper member of a cavity or storage area that as the upper member collapses the flowable material to be expelled through an aperture in a lower surface of the applicator. Similar reference numbers are used in FIGS. 31A-33C to illustrate similar or identical components and features shown in various examples. As such, certain features of the applicators 500B and 500C that are described below with respect to applicator 500A of FIGS. 31A-31C may be described in lesser detail, or may not be described at all as the descriptions herein apply to similar or identical components and features.

FIGS. 31A-31C illustrate exemplary applicator 500A. Applicator 500A may include an elongated handle 510A attached to an upper member 512A. The upper member 512A that is connected to a lower member or base plate 514A to form a storage cavity 516A. The storage cavity 516 may be configured to contain a flowable material as has previously described herein. In addition, applicator 500A may include a support member 518A that extends downward from the upper member 512A below the base plate 514A to position the base plate 514A a predetermined distance from the target surface that receives the flowable material 50. The upper member 512A may have a dome-shaped portion similar to the pod 100 discussed above. The base plate 514A may have an aperture 520A in a pattern similar to any of those patterns described above with respect to apertures 126 of pod 100. As the handle 510A is pushed downward, the upper member 512A may be configured to collapse and expel the flowable material through aperture 520A.

Applicator 500A may be formed from an injection molded polymeric material such as polypropylene (PP) or a low density polyethylene (LDPE) with varying wall thicknesses in the handle 510A, upper member 512A, base plate 514A, or support member 518A to achieve the desired performance requirements such as ensuring the desired collapse of the upper member to properly expel the flowable material through the aperture 520A. The handle 510A, upper member 512A, and support member 518A may be formed as a unitary member while the base plate 514A may be formed separately and then welded or snap-fit into place after the flowable material is inserted. In some examples, the applicator 500A may have the upper member 512A, base plate 514A, and support member 518A vacuum formed while the handle 510A is formed as a separate piece and subsequently connected to the upper member 512A.

FIGS. 32A-32C illustrate exemplary applicator 500B, which may have a generally similar structure to applicator 500A. Applicator 500B may include an elongated handle 510B attached to an upper member 512B that is connected to a lower member or base plate 514B to form a storage cavity 516B. The storage cavity 516B may be configured to contain a flowable material 50 as previously described herein. In addition, applicator 500B may include a support member 518B that extends downward from the upper member 512B below the base plate 514B to position the base plate 514B a predetermined distance from the target surface that receives the flowable material 50. The upper member 512B may have a dome-shaped portion similar to the pod 100 discussed above. The base plate 514B may have an aperture 520B in a pattern similar to any of those patterns described above with respect to apertures 126 of pod 100. As the handle 510B is pushed downward, the upper member 512B may be configured to collapse and expel the flowable material through aperture 520B.

Applicator 500B may have an upper member 512B formed from a thin metallic sheet similar to the metallic sheet used to form pod 100 while the support member 518B and the base plate 514B may be formed together from a thicker metallic sheet. The upper member 512B may be permanently joined to the support member 518B and the base plate 514B by a means such as welding or other method. The support member 518B and the base plate 514B may be formed together as a single member. The handle 510B may be formed from a molded paper pulp that is joined to the upper member via an adhesive or other permanent method.

Figure 33C:
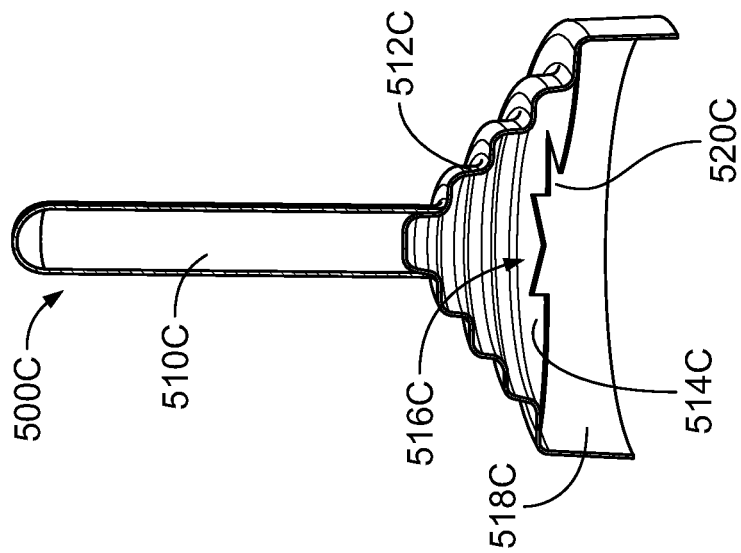
FIG. 33C illustrates a cross-sectional perspective view of the exemplary applicator of FIGS. 33A and 33B according to aspects described herein.
Figure 33B:
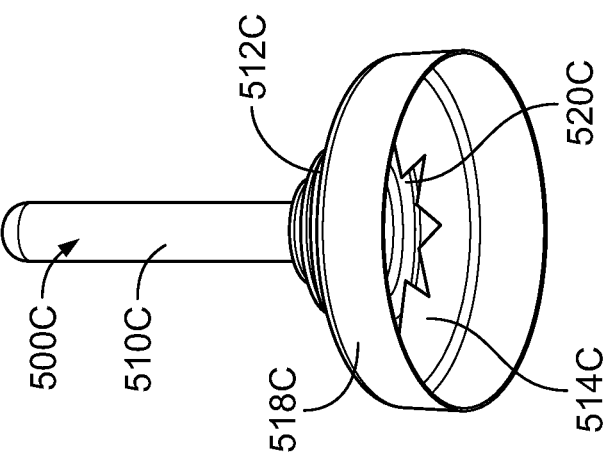
FIGS. 33A and 33B illustrate perspective views of another exemplary applicator for expelling a flowable material according to aspects described herein.
Figure 33A:
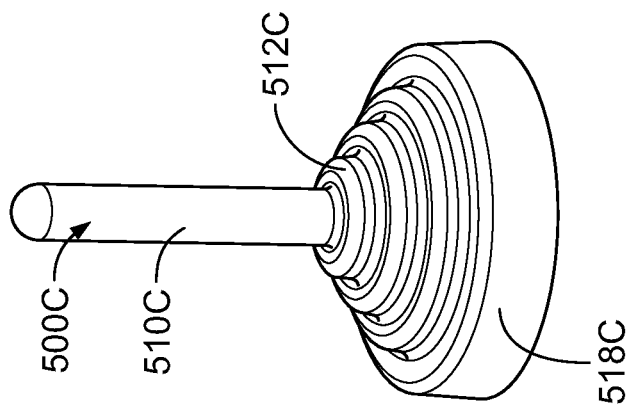

FIGS. 33A-33C illustrate exemplary applicator 500C, which may have a multi-tiered structure for an upper member 512C to help control the collapse of the upper member 512C. Applicator 500C may include an elongated handle 510C attached to the upper member 512C that is connected to a lower member or base plate 514C to form a storage cavity 516C. The storage cavity 516C may be configured to contain a flowable material 50 as previously described herein. In addition, applicator 500C may include a support member 518C that extends downward from the upper member 512C below the base plate 514C to position base plate 514C a predetermined distance from the target surface that receives the flowable material 50. The upper member 512C may have multi-tiered shaped portion similar to the pod 100 discussed above. The base plate 514C may have an aperture 520C in a pattern similar to any of those patterns described above with respect to apertures 126 of pod 100. As the handle 510C is pushed downward, the upper member 512C may be configured to collapse in stages and expel the flowable material through aperture 520C. The multi-tiered structure may be more tolerant when the handle is pushed off-center or at an angle.

Applicator 500C may have a handle 510C, an upper member 512C, and a support member 518C formed as a unitary member from a metallic material, such as aluminum. This unitary member may be formed as an extrusion. The base plate 514C may be formed from a metallic material, such as aluminum, that may be permanently joined (i.e., such as welding) to the upper member 512C to form the cavity 516C.

FIGS. 34A-34C illustrate exemplary applicator 600, which may have a paper pulp based structure that collapses to expel flowable material from a pod 100 that is installed into the applicator 600. Applicator 600 may include an elongated handle 610 attached to an outside surface 611 of an upper member 612. The upper member 612 may have a convex shaped plunger portion 613 extending from an interior surface 614. The upper member 612 may have a dome shaped portion 615 and may also include a substantially vertically oriented portion 616 that extends from the dome shaped portion to a support member 618. The upper member 612 may have an interior cavity 617 that receives a pod 100. The pod 100 may be bonded onto a shelf 620 where between the upper member 612 and the support member 618. The upper portion 110 of the pod 100 may be in close proximity to the plunger portion 613. The support member 618 may extend below the shelf 620 to position the lid 120 of the pod 100 a predetermined distance from the target surface that receives the flowable material. The handle 610, upper member 612, and the support member 618 may be formed as a unitary member formed from a recyclable paper pulp based material.

Figure 35A:
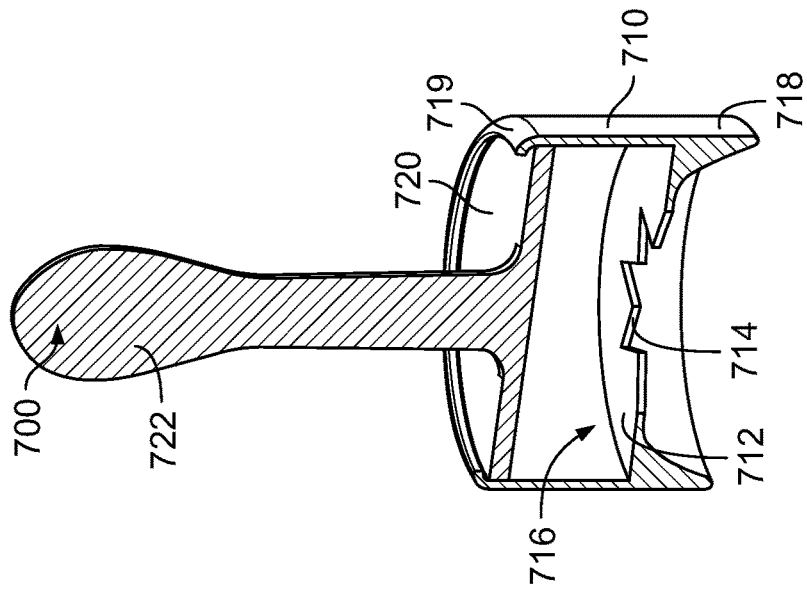
FIGS. 35A and 35B illustrate perspective views of another exemplary applicator for expelling a flowable material according to aspects described herein.
Figure 35B:
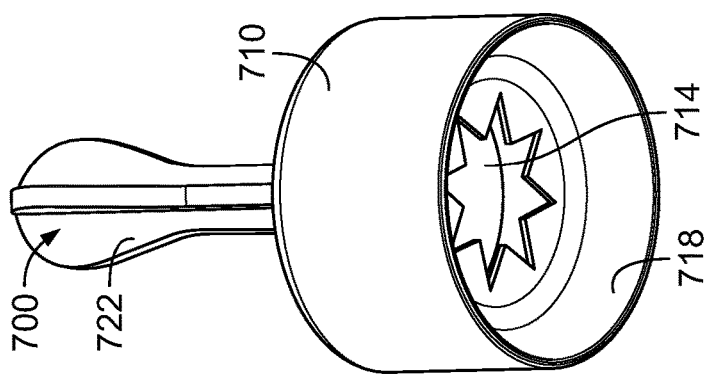
Figure 35C:
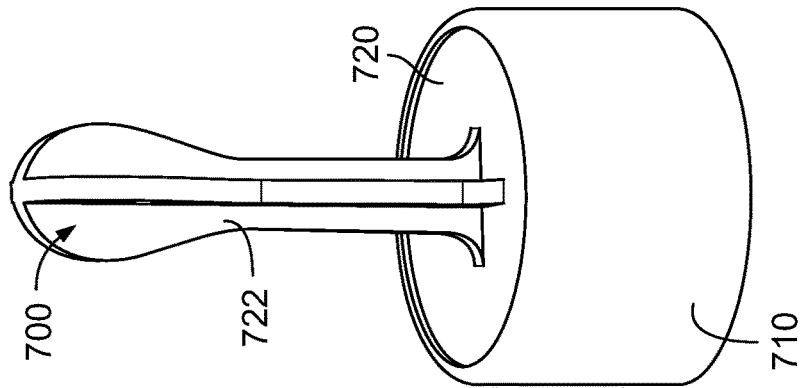
FIG. 35C illustrates a cross-sectional perspective view of the exemplary applicator of FIGS. 35A and 35B according to aspects described herein.

FIGS. 35A-35C illustrate exemplary applicator 700, may operate similarly to applicator 400 described above. Applicator 700 may include a cylindrical base member 710 that includes a base plate 712, an aperture 714 extending through the base plate 712, and a support member 718. The applicator 700 may include a pusher 720 that engages with the cylindrical base member 710, where the pusher 720 includes an elongated handle 722. The pusher 720 may be slidably engaged with the base member 710. In addition, the pusher 720 may have a storage position where the pusher 720 is at the top of the base member 710 to create a storage cavity 716 that holds the flowable material described above. The pusher 720 may have a seal or lip that can help the seal the cavity 716 to ensure that as the pusher 720 is forced downward the flowable material is expelled through aperture 726 that extends through the base plate 712. The pusher 720 may be retained to the base member 710 by a lip 719 that extends around an upper perimeter of the base member 710. The support member 718 may extend below the base plate 712 to position the base plate 712 a predetermined distance from the target surface that receives the flowable material. The support member 718 may also act as a seal for the applicator 700 against the target surface. Applicator 700 may be formed as a base member 710 and a separate pusher 720 that are both formed from a polymeric material such as polypropylene (PP) or low-density polyethylene (LDPE).

Applicator 800 shown in FIGS. 36A and 36B is another exemplary single use applicator. Applicator 800 may include a cardboard or paper based structure with a top plate member 810 and a bottom plate member 812 where the top plate member and the bottom plate member may be pivotally connected at first end 814 of applicator 800. The top plate member 810 and the bottom plate member 812 may be connected at second end 816 opposite the first end 814. An opening 820 may extend through both the top plate member 810 and the bottom plate member 812 at the first end 814. The opening 820 may form a pair of arms 822 on the first end 814 of the applicator 800. In addition, a fold line 824 may be located on both top and bottom plate members 810, 812 between the first end 814 and the second end 816 to create a pocket or gap 818 between the top and bottom plate members 810, 812. A packet 830 may be secured within the gap 818, where the packet 830 may have a cavity 832 that contains the flowable material described above.

To expel the flowable material, the arms 822 may be placed against the target surface where the arms act to space the packet 830 from the target surface. Next, the two plate members 810, 812 may be squeezed together causing the flowable material to flow from the cavity 832 through a predetermined path in the packet 830 to form a dollop of flowable material onto the target surface. The applicator 800 may be die cut from a unitary sheet of cardboard or other paper pulp product that is folded and secured around the separately formed packet 830.

Figure 37C:
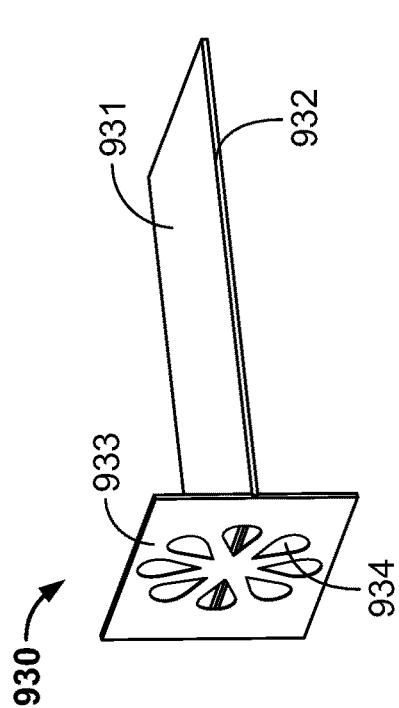
FIG. 37C illustrate perspective views of a packet for the applicator of FIG. 37A according to aspects described herein.
Figure 37D:
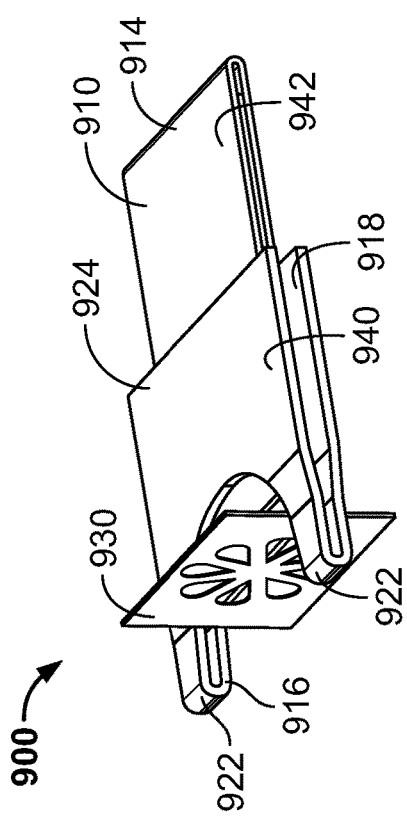
FIG. 37D illustrates a perspective view of the applicator of FIGS. 37A and 37B according to aspects described herein.
Figure 37A:
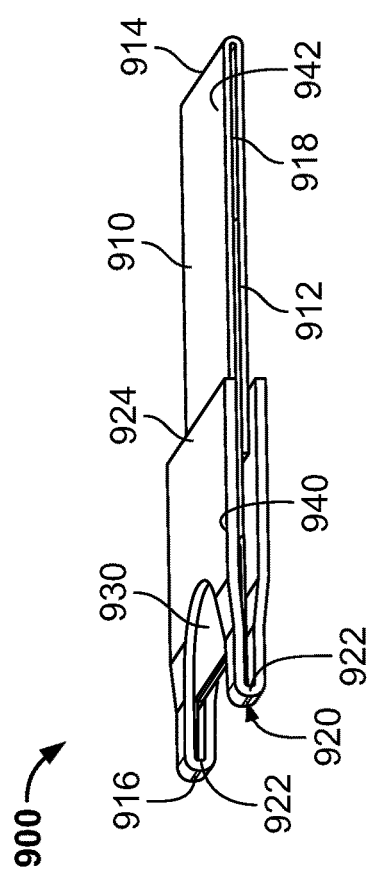
FIGS. 37A and 37B illustrate perspective views of another exemplary applicator for expelling a flowable material according to aspects described herein.
Figure 37B:
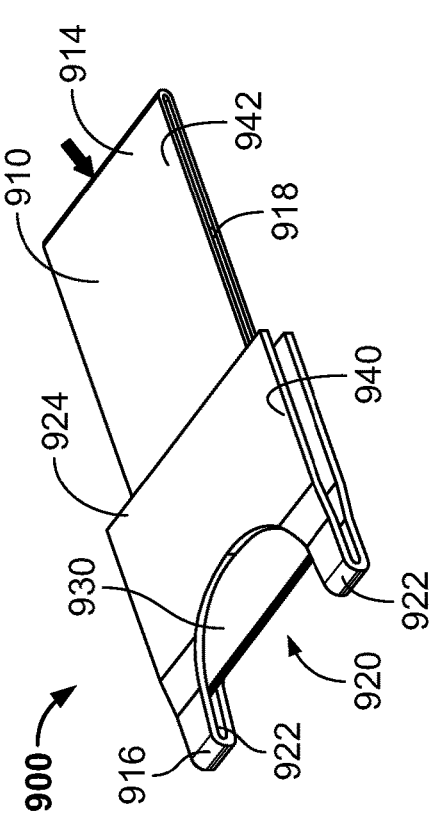
Figure 37F:
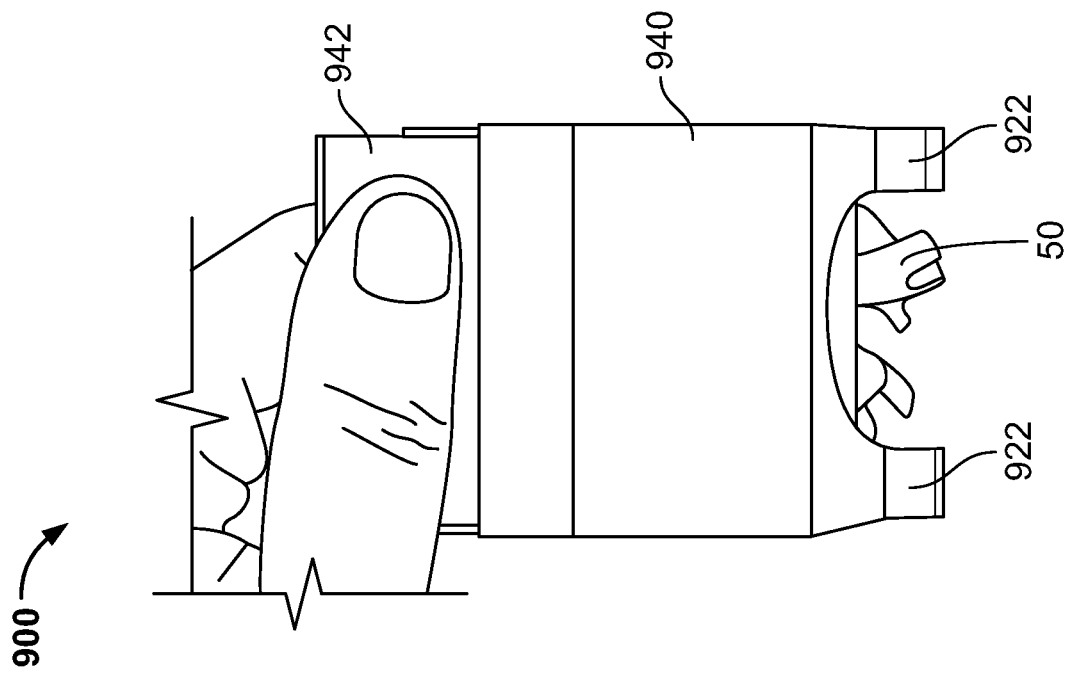
FIG. 37F illustrates a perspective view of the exemplary applicator of FIG. 37A expelling flowable material onto a target surface according to aspects described herein.
Figure 37E:
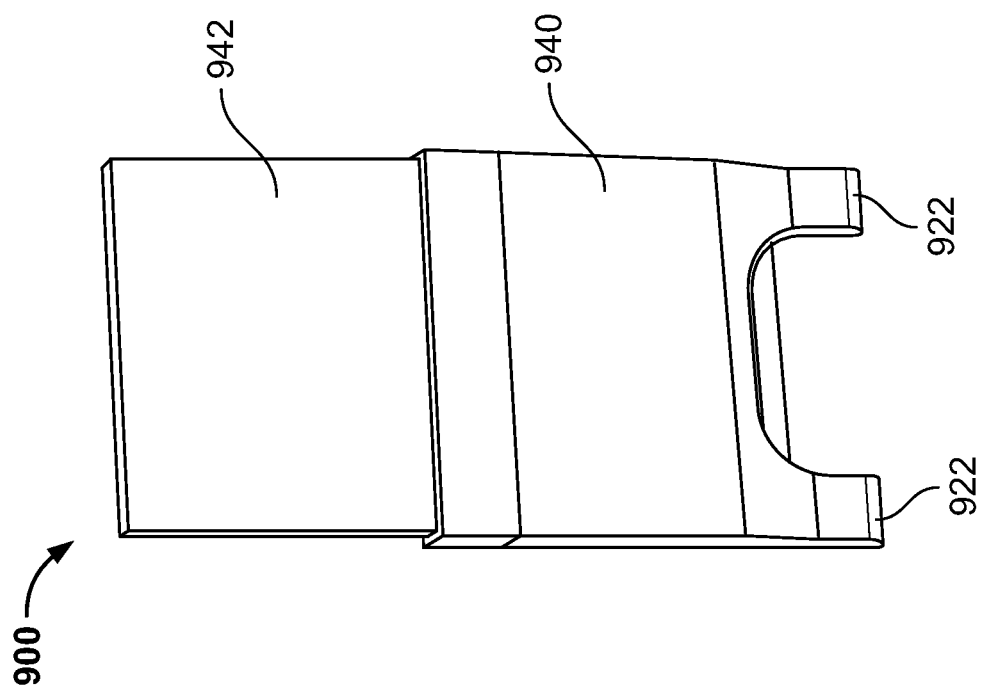
FIG. 37E illustrates a perspective view of the exemplary applicator of FIG. 37A prior to expelling flowable material onto a target surface according to aspects described herein.

Applicator 900, illustrated in FIGS. 37A-37F, may be similar to applicator 800 where the applicator 900 may be formed from a single cardboard member with a top plate member 910 and a bottom plate member 912 where the top plate member 910 and the bottom plate member 912 may be pivotally connected at first end 914 of applicator 900. The top plate member 910 and the bottom plate member 912 may be connected or joined together at second end 916 opposite the first end 914. An opening 920 may extend through both the top plate member 910 and the bottom plate member 912 at the first end 914. The opening 920 may form a pair of arms 922 on the first end 914 of the applicator 900. In addition, a plurality of folds in each plate member 910, 912 may be located on both top and bottom plate members 910, 912 to create a pocket or gap 918 between the top and bottom plate members 910, 912. A packet 930 may be secured within the gap 918. The packet 930 may be formed from two sheets 931, 932 that may be sonic welded together along with the front portion 933, where the packet 930 may include a cavity (not shown) that contains the flowable material described above. The packet 930 may include a front portion 933 with an aperture 934 that may be similar to any of the apertures 126 previously described. The plurality of folds 924 may separate the applicator 900 into a lower member 940 that is formed from a portion of the top plate member 910 and the bottom plate member 912 and an upper member 942 that is formed from a portion of the top plate member 910 and the bottom plate member 912 and an upper member 942. The upper member 942 may be movably engaged with the lower member 940. When the upper member 942 is pushed toward the lower member 940, the cavity of the packet 930 may be compressed to expel the flowable material through the aperture 934 onto the target surface. As shown in FIGS. 37E, to expel the flowable material, the first end 914 may be placed onto the target surface 15, and a user may exert a downward force onto the upper member 942. As the upper member 942 moves downward relative to the lower member 940, the flowable material expelled through the aperture 934 and onto the target surface as shown in FIG. 37F.

Figure 38A:
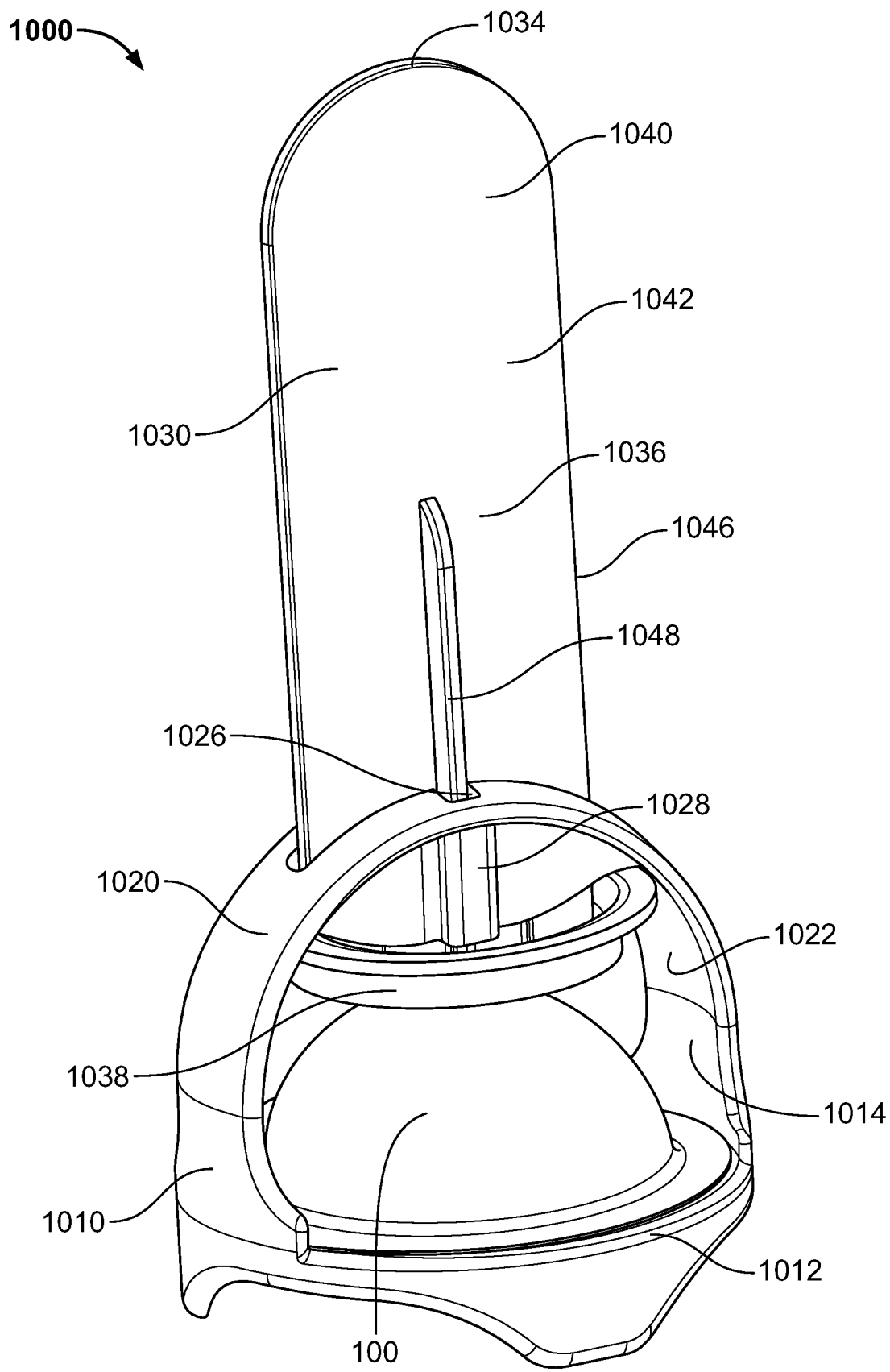
FIG. 38A illustrates a perspective view of another exemplary applicator that expels flowable material from an exemplary storage pod according to aspects described herein.
Figure 38B:
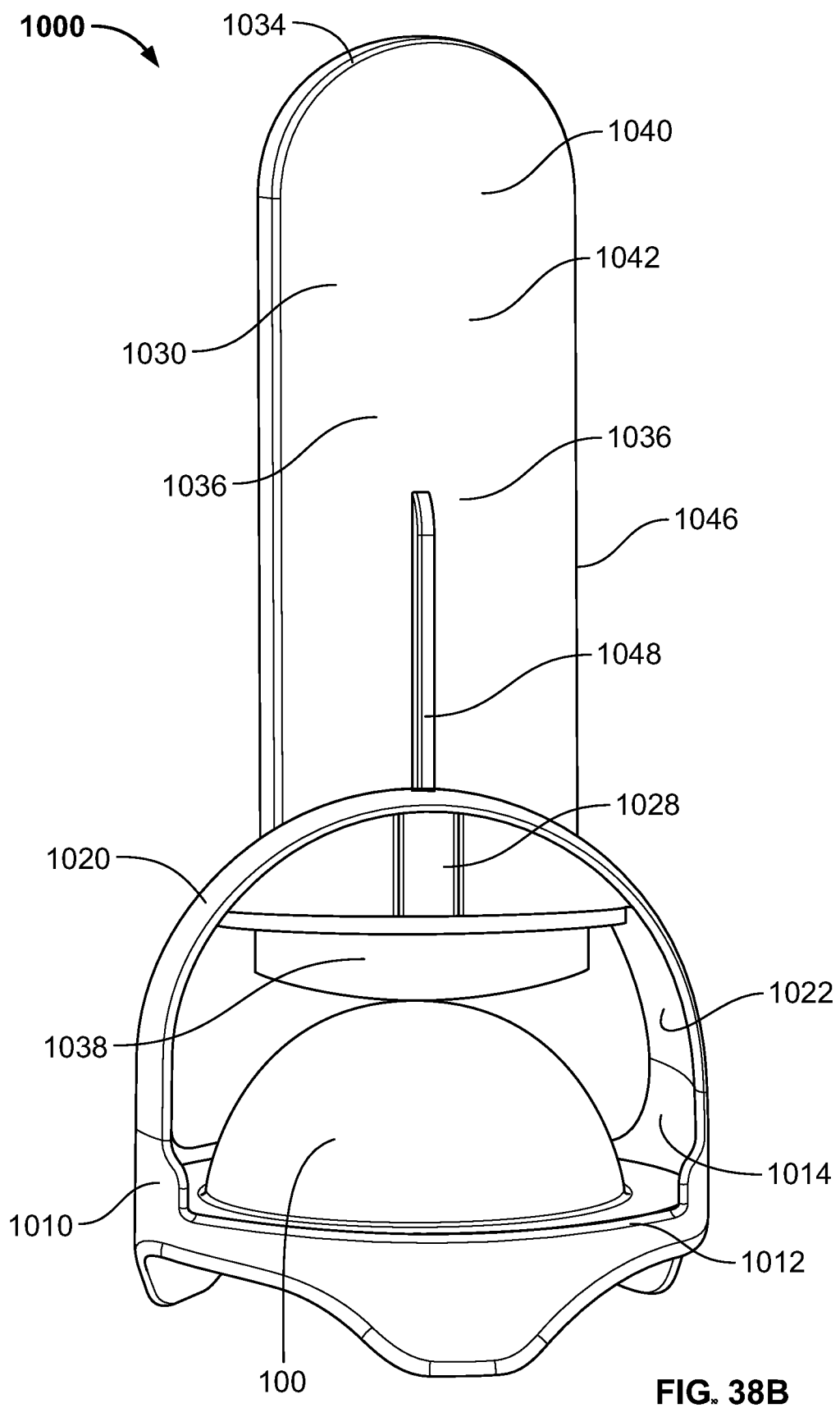
FIG. 38B illustrates a front view of the exemplary applicator of FIG. 38A.
Figure 38C:
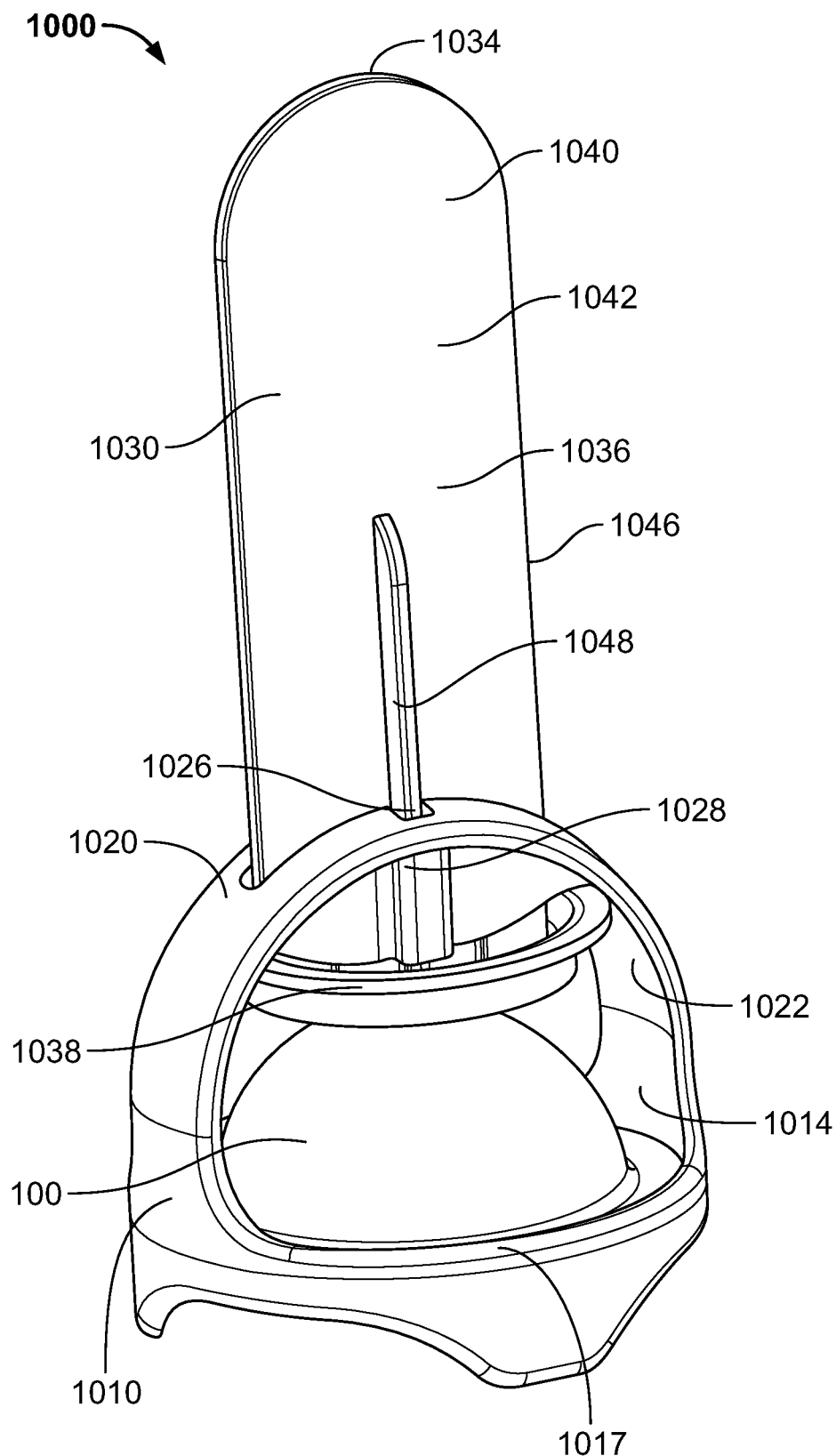
FIG. 38C illustrates another perspective view of the exemplary applicator of FIG. 38A.

FIGS. 38A, 38B, and 38C illustrate another exemplary system, which is similar to the above examples discussed herein. Similar reference numbers are used in FIGS. 38A-38C to illustrate similar or identical components, features, and functionality shown in various examples. As such, certain features of the applicator 1000 that are described below with respect to applicator 1000 of FIGS. 38A, 38B, and 38C may be described in lesser detail, or may not be described at all as the descriptions herein apply to similar or identical components and features.

Referring to FIGS. 38A-38C, like in the above examples, applicator 1000 may include a base 1010, having a base plate 1012, an opening (not shown) extending through the base plate 1012, a receiver 1014 that secures a pod 100, a guide member 1020, a pusher 1030 that is received in guide opening 1026. The pusher body 1036 may have a substantially plate-like shape with a front surface 1042, a rear surface opposite the front surface 1042, and a perimeter surface 1046 extending between the front and rear surfaces. A support rib 1048 may be extend from a first end 1038 (i.e. the dome-shaped end 1038) towards the second end 1034 of the pusher body 1036 along each of the front and rear surfaces. A second support rib (not shown) may extend along the opposite side of the pusher body 1036. In this example, each support rib 1048 may have a length of at least 40 percent of a length of the pusher body 1036 (i.e. a distance between the first end 1038 and the second end 1034), or in some examples, each support rib 1048 may have a length of at least 50 percent of a length of the pusher body 1036. Each rib 1048 may be substantially centered on the front and rear surfaces and may have a width near the first end 1038 that is greater than a width near an end of the rib 1048. This width differential of the ribs may be a result of a tapered width or may be a result of a stepped width such that the width on each side of the step is different. The grip portion 1040 may have a rounded upper portion.

The guide member 1020 may include a central support member 1028 positioned below the circular-shaped portion of the guide member body 1022. The central support member 1028 may help to stabilize and support the pusher 1030 as it moves along the guide opening 1026. Guide opening 1026 may generally correspond in shape to the cross-sectional profile of the pusher body 1036, but slightly larger to allow for a sliding fit between the pusher body 1036 and the guide opening 1026. In this example, the guide opening 1026 may have a wider central region to allow for the ribs 1048 to slide through the opening with narrower end regions. The dome-shaped end 1038 of the pusher 1030 may be smooth surface with a curved rounded outer edge. Alternatively, the dome-shaped end 1038 may have a textured surface, or have a stepped portion, similar to the dome-shaped end of other pushers described herein.

Yet in this example, the base 1010 can be formed as an integral or one-piece component as opposed to two pieces. Additionally, the receiver 1014 can be formed in such a way that the pod 100 is more easily received in applicator 1000 so the user can more easily place a pod 100 into the applicator 1000. For example, the base 1010 can be formed open on either side such that the user can easily place pod 100 therein—the receiver 1014 can define a first side having a first opening and a second side having a second opening. So the receiver 1014 is configured to receive the storage pod 100 in either the first side or the second side. Also, in this example, a portion of the annular lip 1017 has been removed to allow the pod 100 to slide in from the side of the applicator 1000. And the plate of the base 1010 configured to support the storage pod 100 can be flush with a lower portion of the first opening such that the storage pod 100 can easily be inserted into the first opening by the user. In addition, or alternatively the plate of the base 1010 can be flush with a lower portion of the second opening the receiver 1014 for easier placement of the storage pod 100. Additionally, the flange 112 of the pod 100 is not captured after crushing within the base 1010 so that the pod 100 can be easily removed from the base 1010 after usage. This may allow for the applicator 1000 to be more easily reused for dispensing of multiple pods 100 as desired by the user. FIG. 38C another perspective view of the example dispenser of FIG. 38A. As shown in FIG. 38C, the base can include a lip 1017 of a smaller height or lower profile such that the user can still easily load the applicator 1000 with pods 100. The lip 1017 can be located on one side of the applicator 1000, while the opposite side as shown in FIGS. 38A and 38B can be open. The lip 1017 helps to retain the pod 100 in place during the dispensing of the flowable material. In particular, the lip 1017 can assist in retaining pod 100 in the appropriate location as the pusher body 1136 is pressed against pod 100, while the open side shown in FIGS. 38A and 38B allows the user to easily place the pod 100 in the receiver 1014 of the base 1010. But it is also contemplated that the lip 1017 can extend circumferentially in the area of the opening or receiver 1014 such that the lip 1017 extends on both sides and surrounds the pod, such as in other examples shown herein. Yet, in other examples, the annular lip 1017 may be removed on both sides, such that user can easily place the pod 100 within the base 1010 on either side.

Figure 39A:
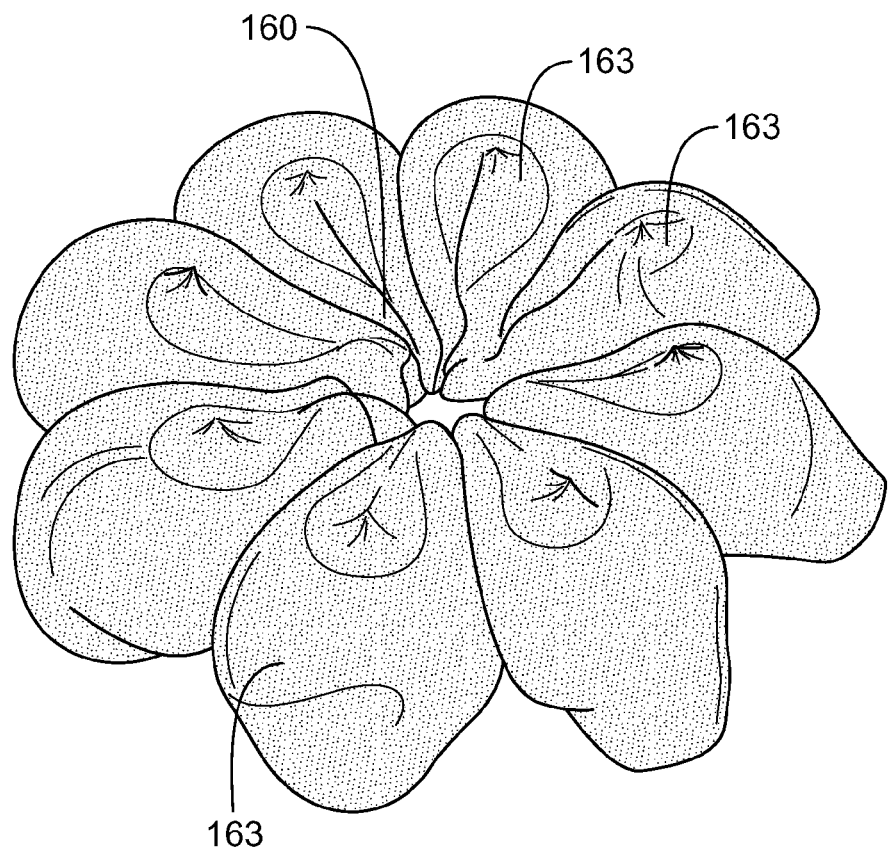
FIG. 39A illustrates a top perspective view of a flowable material when dispensed from the example applicators in FIGS. 38A-38B and 38C.
Figure 39B:
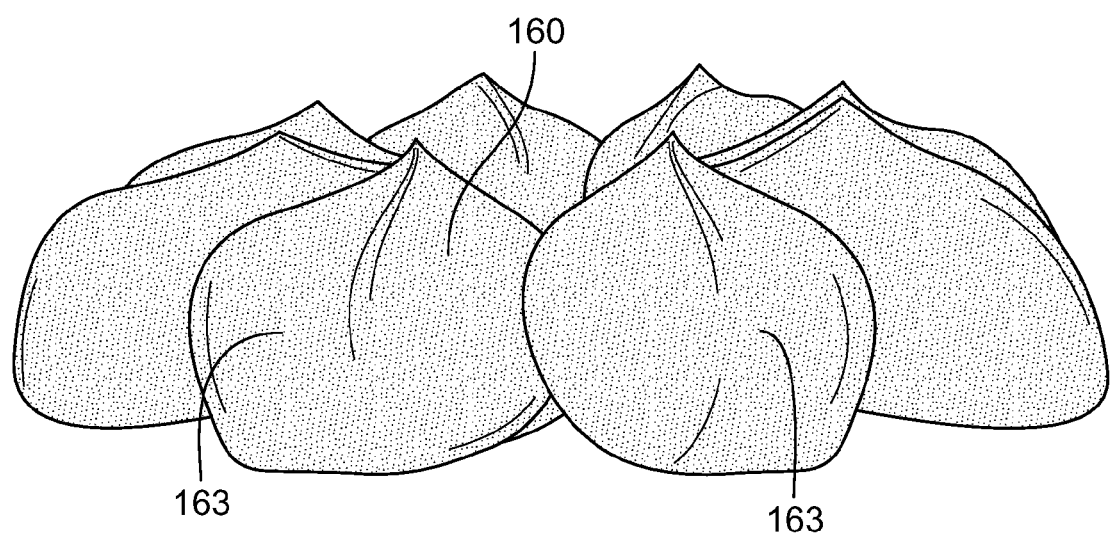
FIG. 39B illustrates a side perspective view of a flowable material when dispensed from the example applicators in FIGS. 38A-38B and 38C.

FIGS. 39A and 39B illustrates views of a flowable material when dispensed from the example applicators in FIGS. 38A-38C. Similar to the above examples, the applicator 1000 and the pod 100 can be configured to dispense a dollop shape 160 having several petals 163. Each petal 163 can have a bulbous shape. This dollop shape 160 may help to create more foam during flushing. The bulbous shape of the petals 163 can create more turbulence of the flush water that washes away more formula resulting in greater foaming. The dollop shape 160 can be formed as is discussed herein with various apertures as described in relation to FIGS. 6A and 6C, can be formed in various desired shapes, e.g. rectangular, circular, oval, and even and odd sided polynomials, etc., and can be formed of various formulations as discussed herein. Although the flowable material of FIGS. 39A and 39B is described in relation to the applicator example in FIGS. 38A-38C, it is contemplated that the flowable material patterns of FIGS. 39A and 39B can dispensed or formed with other applicator examples discussed herein including but not limited to the applicators described in relation to FIGS. 9A, 9B, 13 and 16-30E.

Those having skill in the art, with the knowledge gained from the present disclosure, will recognize that various changes can be made to the disclosed apparatuses and methods in attaining these and other advantages, without departing from the scope of the present invention. As such, it should be understood that the features described herein are susceptible to modification, alteration, changes, or substitution. For example, it is expressly intended that all combinations of those elements and/or steps, which perform substantially the same function, in substantially the same way, to achieve the same results, are within the scope of the invention. Substitutions of elements from one described embodiment to another are also fully intended and contemplated. The specific embodiments illustrated and described herein are for illustrative purposes only, and not limiting of the invention as set forth in the appended claims. Other embodiments will be evident to those of skill in the art. It should be understood that the foregoing description is provided for clarity only and is merely exemplary. The spirit and scope of the present invention are not limited to the above examples, but are encompassed by the following claims. All publications and patent applications cited above are incorporated by reference in their entirety for all purposes to the same extent as if each individual publication or patent application were specifically and individually indicated to be so incorporated by reference.

What is claimed is:

1. A system for dispensing a flowable material onto a surface comprising:
    a storage pod for the flowable material comprising:
        a housing that includes an upper portion and a flange extending around a perimeter of the housing;
        a lid attached to the housing defining an interior volume, wherein the lid includes an inner layer that includes an aperture and a removable outer layer that when present covers a portion of the inner layer;
        the flowable material disposed within the interior volume; and
    an applicator comprising:
        a base including a receiver, the receiver for holding the storage pod, the receiver defining a first side defining a first opening of the applicator and also defining a second side with a second opening, wherein the receiver is configured to receive the storage pod in the first side or the second side; and
        a pusher mechanism configured to contact the upper portion of the housing, and
    wherein the upper portion of the housing is configured to collapse when receiving a force applied from a user through the pusher mechanism, and when the upper portion collapses, the flowable material is extruded through the aperture.

2. The system of claim 1, wherein the upper portion is dome-shaped.

3. The system of claim 1, wherein the receiver comprises a wall extending from the base, and wherein the pusher mechanism is slidably engaged with the wall, wherein the pusher mechanism has a first end that contacts the storage pod and a second end opposite the first end.

4. The system of claim 3 wherein the wall comprises a guide opening for receiving the pusher mechanism.

5. The system of claim 3, wherein the base and the wall are formed as a single unitary member.

6. The system of claim 3, wherein the pusher mechanism includes a rib and wherein the rib is configured to be received in a correspondingly shaped guide located on the wall.

7. The system of claim 3, wherein the first end of the pusher mechanism includes a dome-shaped end that is substantially aligned with a longitudinal axis of the storage pod.

8. The system of claim 7, wherein the dome-shaped end has a width that is less than a width of a pusher body of the pusher mechanism.

9. The system of claim 1, wherein the applicator includes a support member extending from the base configured to contact the surface that receives the flowable material, wherein the support member positions the base a fixed distance from the surface, and wherein the support member comprises a plurality of legs extending from the base.

10. The system of claim 1, wherein the base further comprises a plate configured to support the storage pod and wherein the plate is flush with a lower portion of the first opening such that the storage pod can be inserted into the first opening.

11. The system of claim 1 wherein the second side defines a first lip and wherein the first lip is configured to retain the storage pod within the receiver when the force is applied from the user through the pusher mechanism.

12. The system of claim 11 wherein the first side of the receiver also comprises a second lip configured to retain the storage pod within the receiver when the force is applied from the user through the pusher mechanism.

13. The system of claim 1, wherein the flowable material is a cleaning gel.

14. The system of claim 13, wherein an amount of the cleaning gel within the interior volume is between 5 grams and 10 grams.

15. The system of claim 1, wherein the lid is attached to the flange.

16. The system of claim 2, wherein a height of the storage pod measured from the lid and a top of the housing is less than a radius of the dome-shaped upper portion.

17. The system of claim 1, wherein the flange forms a planar surface, and wherein an angle formed at an intersection of the flange and the upper portion is greater than 90 degrees.

18. The system of claim 1, wherein when the removable outer layer of the lid is removed, the aperture of the inner layer and the flowable material are exposed.

19. The system of claim 1, wherein the housing is formed from an aluminum alloy, a polypropylene, a high-density polyethylene, or a low-density polyethylene.

20. The system of claim 1, wherein the aperture comprises a single opening.

\* \* \* \* \*